United States Patent
Georgiev et al.

(10) Patent No.: US 9,736,455 B2
(45) Date of Patent: Aug. 15, 2017

(54) METHOD AND APPARATUS FOR DOWNSCALING DEPTH DATA FOR VIEW PLUS DEPTH DATA COMPRESSION

(71) Applicant: Nokia Technologies Oy, Espoo (FI)

(72) Inventors: Mihail Georgiev, Tampere (FI); Atanas Gotchev, Tampere (FI)

(73) Assignee: Nokia Technologies Oy, Espoo (FI)

( * ) Notice: Subject to any disclaimer, the term of this patent is extended or adjusted under 35 U.S.C. 154(b) by 130 days.

(21) Appl. No.: 14/497,687

(22) Filed: Sep. 26, 2014

(65) Prior Publication Data

US 2016/0094829 A1    Mar. 31, 2016

Related U.S. Application Data

(60) Provisional application No. 61/962,326, filed on Jun. 30, 2014.

(51) Int. Cl.
*H04N 13/00* (2006.01)
*H04N 19/00* (2014.01)

(52) U.S. Cl.
CPC ......... *H04N 13/0048* (2013.01); *H04N 19/00* (2013.01)

(58) Field of Classification Search
CPC .................................................. H04N 13/0048
(Continued)

(56) References Cited

U.S. PATENT DOCUMENTS

2010/0239180 A1    9/2010    Yea et al.
2011/0110601 A1    5/2011    Hong
(Continued)

FOREIGN PATENT DOCUMENTS

AU           2011265340 A1    7/2013
WO    WO 2011/046607 A2    4/2011
(Continued)

OTHER PUBLICATIONS

Achanta, R. et al., *SLIC Superpixels*, Ecole Polytechnique Federale de Lausanne, EPFL Technical Report 149300 (Jun. 2010) 1-15.
(Continued)

*Primary Examiner* — Richard Torrente
(74) *Attorney, Agent, or Firm* — Alston & Bird LLP

(57) ABSTRACT

A method, apparatus, and computer program product are disclosed for compression of a 2D-plus-depth representation based on spatial downsampling of an initial depth map. By utilizing the color image accompanying the initial depth map, it is possible to infer structural information that refines and reconstructs the initial depth map out of a heavily subsampled version of the depth map. In the process, no indexing of the exact positions of the subsampled depth values is needed, which leads to very efficient compression. An example method causes segmentation of the color image into a set of super-pixel segments, and causes downsampling of the initial depth map based on the set of super-pixel segments. The method subsequently causes generation and storage of a compressed representation based on the segmented color image and the downsampled depth map. A corresponding apparatus and computer program product are also provided.

20 Claims, 22 Drawing Sheets
(21 of 22 Drawing Sheet(s) Filed in Color)

(58) Field of Classification Search
USPC .......................................................... 348/43
See application file for complete search history.

(56) References Cited

U.S. PATENT DOCUMENTS

| | | | |
|---|---|---|---|
| 2012/0251003 A1 | 10/2012 | Perbet et al. | |
| 2013/0194255 A1 | 8/2013 | Lee et al. | |
| 2014/0153829 A1* | 6/2014 | Pham | G06K 9/34 382/173 |
| 2014/0184744 A1* | 7/2014 | Liu | H04N 19/597 348/43 |

FOREIGN PATENT DOCUMENTS

| | | |
|---|---|---|
| WO | WO 2013/032423 A1 | 3/2013 |
| WO | WO 2013/095248 A1 | 6/2013 |

OTHER PUBLICATIONS

Belyaev, E. et al., *An Efficient Adaptive Binary Arithmetic Coder With Low Memory Requirement*, IEEE Journal of Selected Topics in Signal Processing, vol. 7, No. 6 (Dec. 2013) 1053-1061.

Bergh, M. et al., *SEEDS: Superpixels Extracted via Energy-Driven Sampling*, Proceedings of the 12$^{th}$ European Conference on Computer Vision (ECCV), (2012) 13-26.

Boev, A. et al., *Adaptive Scales as a Structural Similarity Indicator for Image Quality Assessment*, Proc. of the 2$^{nd}$ Int. Workshop on Video Process. And Quality Metrics for Consumer Electronics, (2006) 4 pages.

Boev, Atanas, *Perceptually Optimized Visualization on Autostereoscopic 3D Displays*, Tampere University of Technology Publication 1063 (2012) 292 pages.

Bookstein, Fred, *Principal Warps: Thin-Plate Splines and the Decomposition of Deformations*, IEEE Transactions on Pattern Analysis and Machine Intelligence, vol. 11, No. 6 (Jun. 1989) 567-585.

Buades, A. et al., *A non-local algorithm for image denoising*, Proceedings of Conference of Computer Vision and Pattern Recognition, vol. 2 (2005) 6 pages.

Dimenco B.V., *3D Content Creation Guidelines*, 3D Interface Specification, (Mar. 29, 2011) 1-11.

ETHZ—Computer Vision Lab: *Software* [online] [retrieved Apr. 9, 2015]. Retrieved from the Internet: <URL: http://www.vision.ee.ethz.ch/software/>. (Nov. 7, 2013) 2 pages.

Georgiev, M. et al., *Joint De-Noising and Fusion of 2D Video and Dept Map Sequences Sensed by Low-Powered TOF Rang Sensor*, International Conference on Media & Expo, (2013) 4 pages.

Hoffmann, S. et al., *Compression of Depth Maps with Segment-Based Homogeneous Diffusion*, J. of Scale Space and Variational Methods in Computer Vision, vol. 7893 (2013) 319-330.

Huffman, D., *A Method for the Construction of Minimum-Redundancy Codes*, Proceedings of the IRE, vol. 40, No. 9 (1952) 1098-1101.

Jager, Fabian, *Contour-based Segmentation and Coding for Depth Map Compression*, RWTH Aachen University (2011) 4 pages.

Kolb, A. et al., *Time-of-Flight Cameras in Computer Graphics*, Computer Graphics Forum, vol. 29, No. 1 (2010) 141-159.

Martin, D. et al., *A Database of Human Segmented Natural Images and its Application to Evaluating Segmentation Algorithms and Measuring Ecological Statistics*, IEEE International Conference on Computer Vision (ICCV) (Jul. 2001) 416-423.

Milani, S. et al., *Efficient Depth Map Compression Exploiting Segmented Color Data*, IEEE International Conference on Multimedia and Expo(ICME) (Jul. 2012) 6 pages.

Morkel, T., *An Overview of Image Steganography*, Information and Computer Security Architecture (ICSA) Research Group, (Jun./Jul. 2005) 12 pages.

Muller, K. et al., *3-D Video Representation Using Depth Maps*, Proceedings of the IEEE, vol. 99, No. 4 (Apr. 2011) 643-656.

Mvdblive.org—SEEDS [online] [retrieved Apr. 9, 2015]. Retrieved from the Internet: <URL: http://www.mvdblive.org/seeds/>. 4 pages.

Ndjiki-Nya, P. et al., *Depth Image-Based Rendering With Advanced Texture Synthesis for 3-D Video*, IEEE Transactions on Multimedia, vol. 13, No. 3 (Jun. 2011) 453-465.

Ponomarenko, N. et al., *ADCTC: Advanced DCT-Based Image Coder*, Proceedings of LNLA, Switzerland, (Aug. 2008) 6 pages.

Ponomarenko, N. et al., *Intra-frame Depth Image Compression Based on Anistropic Partition Scheme and Plane Approximation*, IEEE Immerscom, (May 2009) 6 pages.

Porikli, F. et al., *Multimedia Quality Assessment (DSP Forum)*, IEEE Signal Processing Magazine, (Nov. 2011) 164-177.

Ren, X. et al., *Learning a Classification Model for Segmentation*, Proceedings of the Ninth IEEE International Conference on Computer Vision (2003) 1-8.

Scharstein, D. et al., *A Taxonomy and Evaluation of Dense Two-Frame Stereo Correspondence Algorithms*, International Journal of Computer Vision, vol. 47 (1/2/3) (2002) 7-42.

Schiopu, I. et al., *Lossy Depth Image Compression using Greedy Rate-Distortion Slope Optimization*, IEEE Signal Processing Letters, vol. 20, No. 11 (Nov. 2013) 1066-1069.

Schiopu, I., *MDL Segmentation and Lossless Compression of Depth Images*, IEEE Signal Processing Letters (2011) 4 pages.

Sheng, L. et al., *Depth Enhancement Based on Hybrid Geometric Hole Filling Strategy*, IEEE International Conference on Image Processing (2013) 2173-2176.

Soh, Y. et al., *Superpixel-Based Depth Image Super-Resolution*, SPIE Proceedings vol. 8290, Three-Dimensional Image Processing (3DIP) and Applications II (2012) 10 pages.

*Superpixel code* [online] [retrieved Apr. 9, 2015]. Retrieved from the internet: <URL http://www.cs.sfu.ca/~mori/research/superpixels/>.

Thin-plate smoothing spline—MATLAB tpaps, [online] [Retrieved Jan. 21, 2015]. Retrieved from the Internet: <URL: http://www.mathworks.com/help/curvefit/tpaps.html>. 3 pages.

Tomasi, C. et al., *Bilateral Filtering for Gray and Color Images*, Proceedings of the IEEE International Conference on Computer Vision, (1998) 839-846.

Yang, O. et al., *Spatial-Depth Super Resolution for Range Images*, IEEE Conference on Computer Vision and Pattern Recognition (CVPR 2007), 1-8.

Yang, X. et al., *DIBR Based View Synthesis for Free-Viewpoint Television*, 3DTV (2011) 4 pages.

YUV pixel formats [online] [retrieved Jan. 21, 2015]. Retrieved from the Internet: <URL: hppt://www.fourcc.org/yuv.php#NV21>. (dated Mar. 27, 2013) 15 pages.

Ziv, J. et al., *Compression of Individual Sequences via Variable-Rate Coding*, IEEE Transactions on Information Theory, vol. 24, No. 5 (Sep. 1978) 530-536.

Extended European Search Report from corresponding European Patent Application No. 15173286.4, dated Dec. 3, 2015.

Morvan, Yannick et al.; "*Novel Coding Technique for Depth Images Using Quadtree Decomposition and Plane Approximation*"; Proceedings of SPIE, International Society for Optical Engineering; vol. 5960, No. 3; Jan. 1, 2005; pp. 1187-1194; XP008080554.

Karsten Muller et al.. "*3-D Video Representation Using Depth Maps*"; Proceedings of the IEEE; vol. 99, No. 4; Apr. 1, 2011; pp. 643-656; XP011363621.

Office Action for European Application No. 15 173 286.4 dated Jul. 5, 2017.

\* cited by examiner

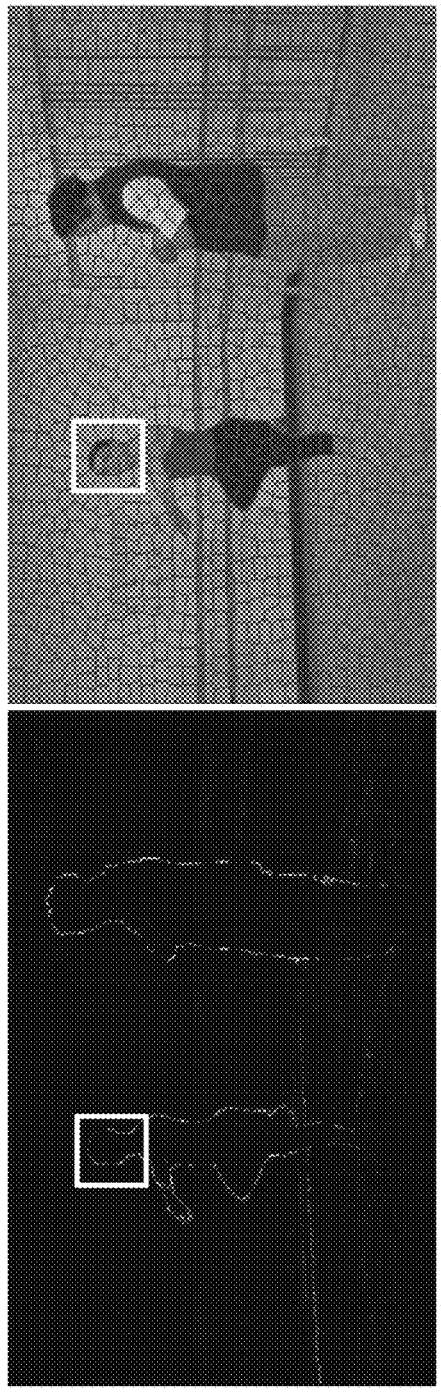
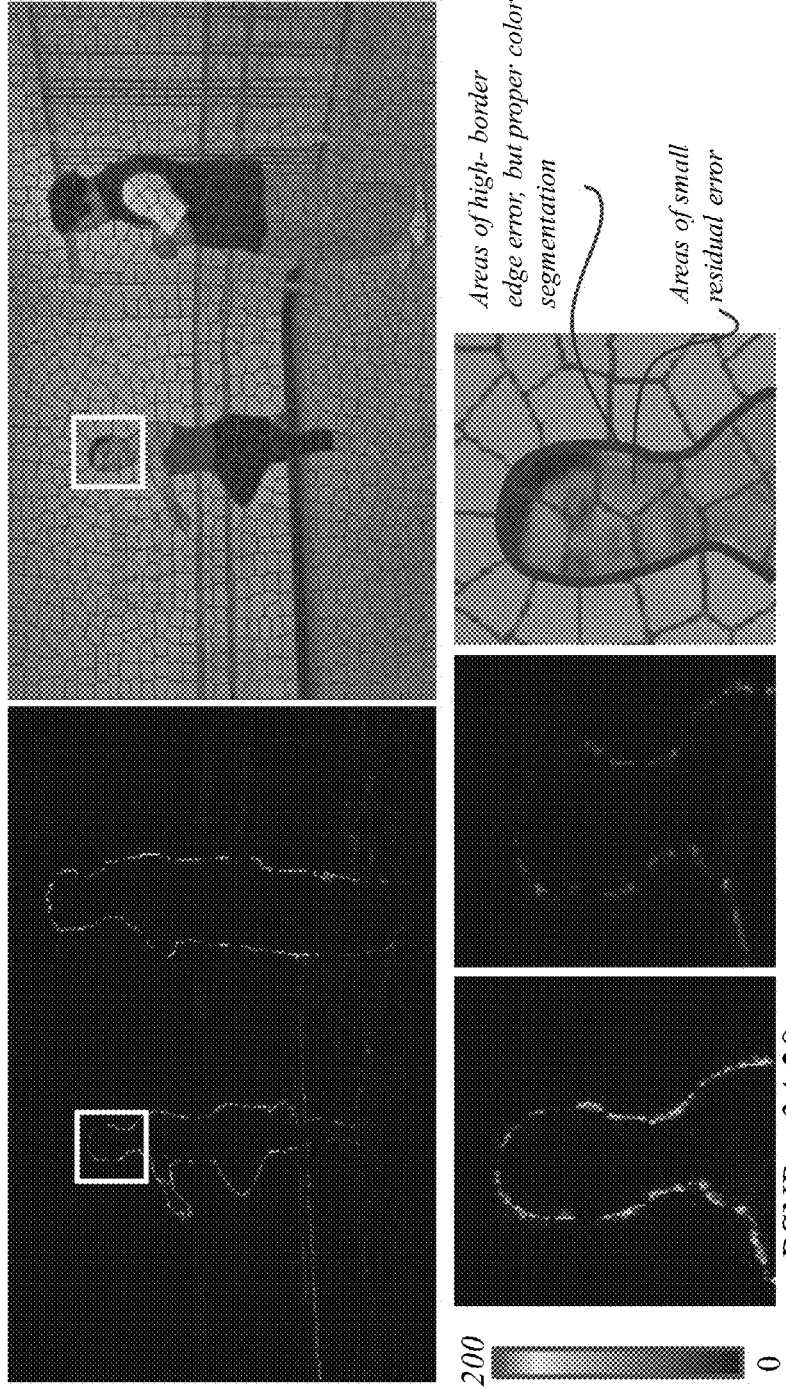
FIG. 15A
FIG. 15B
FIG. 15C
PSNR – 37.28 FIG. 15D
PSNR – 34.28 FIG. 15E
Areas of high-border edge error; but proper color segmentation
Areas of small residual error

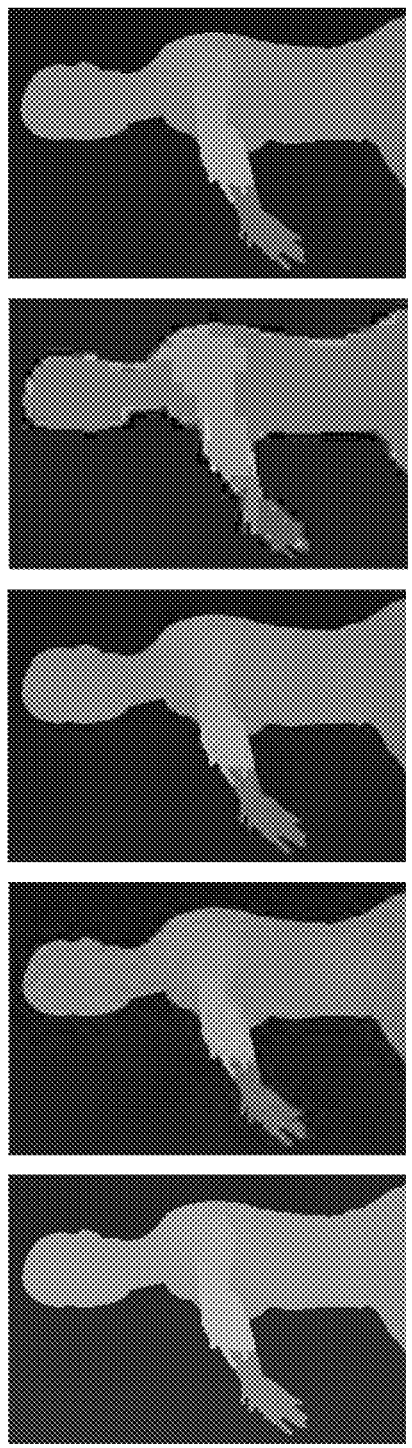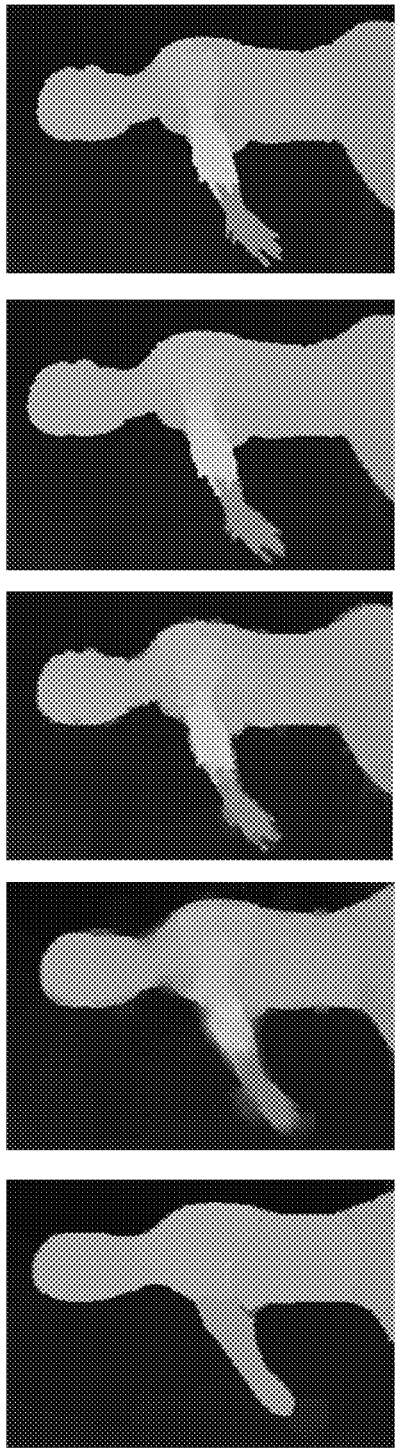
FIG. 16A  FIG. 16B  FIG. 16C  FIG. 16D  FIG. 16E
FIG. 16F  FIG. 16G  FIG. 16H  FIG. 16I  FIG. 16J

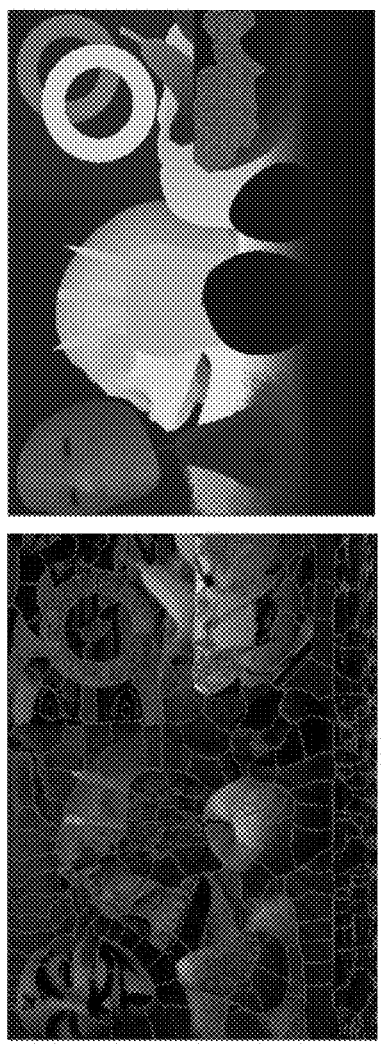
FIG. 17A
FIG. 17B
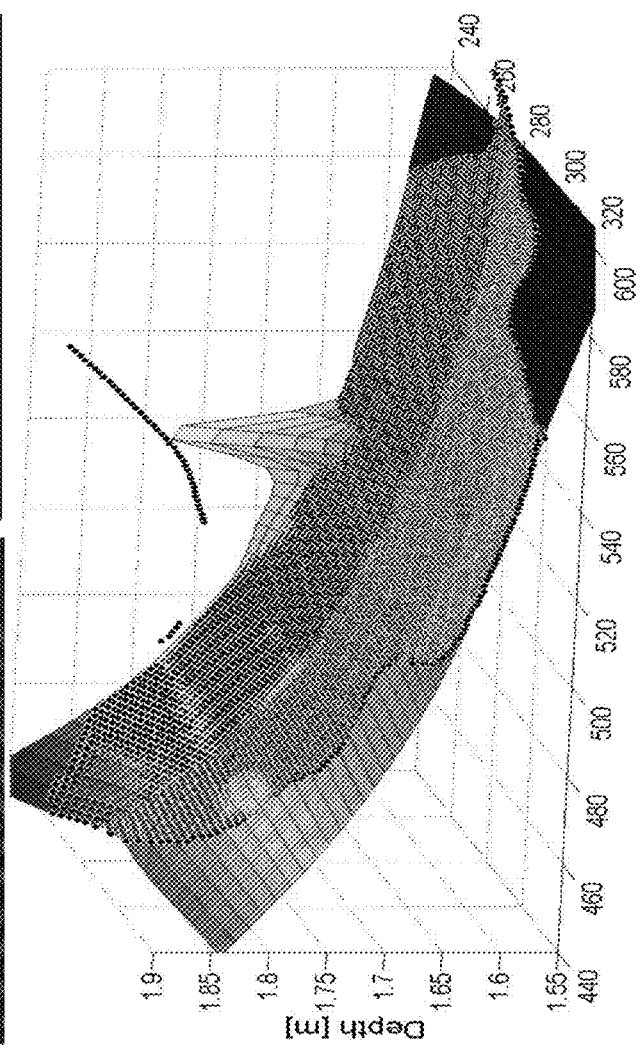
FIG. 17C

METHOD AND APPARATUS FOR DOWNSCALING DEPTH DATA FOR VIEW PLUS DEPTH DATA COMPRESSION

CROSS-REFERENCE TO RELATED APPLICATIONS

This application claims the benefit of U.S. Provisional Application No. 61/962,326 (formerly U.S. Non-Provisional application Ser. No. 14/319,144), filed on Jun. 30, 2014, the entire contents of which are incorporated herein by reference.

TECHNOLOGICAL FIELD

Example embodiments of the present invention relate generally to image compression and, more particularly, to a method and apparatus for compressing two dimensional (2D)-plus-depth representations while substantially preserving human-perceived image quality.

BACKGROUND

One way to convey information about the structure of a three dimensional (3D) visual scene is to augment a color two dimensional (2D) image with information about the visual scene's geometry. The geometry information may be conveyed using a gray-scale image referred to as a "depth map" that shows the distance between each color pixel and its corresponding scene point in 3D space. The combination of the 2D color image with the depth map can be referred to as a "view-plus-depth," "RGB-Z," or "2D-plus-depth" representation, and is described in greater detail in Dimenco, B. V., "3D Content Creation Guidelines," 3D Interface Specification, www.dimenco.eu (2011), Mueller K., Merkle P., Wiegand T., "3-D video representation using depth maps," in Proceedings of the IEEE, Special Issue on "3D Media and Displays," invited paper, 99(4), pp. 643-656 (2011), and Ndjiki-Nya, P. et al., "Depth Image-based Rendering with Advanced Texture Synthesis for 3D Video," in IEEE Transactions on Multimedia, 13(3), pp. 453-465 (2011).

In a 2D-plus-depth representation, the depth map is stored as a greyscale image side-by-side with the color image, so that each pixel of the 2D color image has a corresponding depth value stored in the same pixel position on the corresponding depth map. This sort of scene representation may be used to render perspective views on 3D displays (e.g., auto-stereoscopic 3D displays) or for 3D view generation by Depth-Image-Based Rendering (DIBR) methods, as detailed by X. Yang in "DIBR based view synthesis for free-viewpoint television", published in 3DTV conference: The True Vision—Capture, Transmission and Display of 3D Video (3DTV-Con), 2011. Depth map data is created by techniques such as "structure-from-stereo" or as sensed by dedicated range (depth) sensors employing, for example, Time-of-Flight sensing principles, as described in Kolb, A., Barth, E., Koch, R., and Larsen, R., "Time-of-flight cameras in computer graphics," Computer Graphics Forum 29(1), 141-159 (2010).

The biggest drawback of the 2D-plus-depth data format is its inefficient use of pixel bit budget, because the use of two aligned images doubles the required number of bits. For example, where $s_x$ represents the pixel width of an image and $s_y$ represents the pixel height, a high-definition (HD) image will require a pixel size ($S_{pixels}$) as shown in Equation 1 below:

$$S_{pixels}=2(s_x s_y c)=2(1920\times1080\times3)=12,441,600 \quad (1)$$

Accordingly, it is apparent that such a large amount of data requires the use of data compression.

The depth maps in 2D-plus-depth representations are textureless and piece-wise smooth, so predictive and arithmetic coding are attractive alternatives. However, it is important in case of lossy compression that depth data is considered as a mapping function (a function that establishes some geometry within the scene) rather than as just a gray-scale intensity image. In the latter case, a direct lossy compression of the depth image could limit the number of applications that can utilize the compressed depth maps. Accordingly, a proper compression that does not distort significantly the mapping is required.

BRIEF SUMMARY

An example embodiment of the present invention may address the above issues by providing 2D-plus-depth representation compression based on spatial downsampling of a given depth map that is aimed at preserving important structural details and visual cues. These example embodiments may utilize structural information from the accompanying color data to rebuild a depth map similar to the original one. The overhead may require very little file space for segmentation indexing. It does not need to keep the segment pixel position, shape or contours.

Super-pixel segmentation of the color image can be used to guide the selection of an optimal depth value per segment. The depth value selection may be done within the loop of a depth-enhancing joint-bilateral filter aimed at improving quality and increasing compression performance. The downsampled depth map may be handled by predictive and arithmetic coding. In some embodiments, an iterative segmentation handles possible depth sensing artifacts that do not coincide accurately with scene objects.

The resulting downsampled data may require little storage space, which can be embedded as metadata in a header file or in place of perceptually insignificant color data (a steganographic type of data embedding). The latter mechanism may produce jointly compressed view-plus-depth data that is similar in size to compressed color-only data without any perceivable loss of quality while also including additional geometrical information suitable for 3D applications.

The methods, apparatuses, and computer program products provided herein are applicable for various geometry representation modes, including disparity, quantized depth, and floating-point depth, and are suitable for many applications, such as watermarking and steganography that could preserve depth modality data by image cropping or mild lossy compression.

In a first example embodiment, a method is provided that includes receiving a 2D-plus-depth representation. The 2D-plus-depth representation includes a color image and an original depth map. The method of this example embodiment further includes causing segmentation of the color image into a set of super-pixel segments, and causing, by a processor, downsampling of the original depth map based on the set of super-pixel segments. Moreover, the method of this example embodiment further includes causing generation of a compressed representation based on the segmented color image and the downsampled depth map, and causing storage of the compressed representation. The compressed representation may include one or more segmentation parameters associated with the segmentation of the color image and one or more downsampling parameters associated with the downsampling of the original depth map.

In some embodiments, downsampling of the original depth map may include identifying portions of the original depth map that correspond to segments of the set of super-pixel segments. For each identified portion of the original depth map, the method may include identifying a depth intensity value, and modifying the portion of the original depth map based on the identified depth intensity value. The one or more downsampling parameters may thus include the identified depth intensity values. In an instance in which the original depth map includes floating point data, identifying the depth intensity value may include applying a thin-plate spline fitting function to the portion of the original depth map.

The method may further include causing reconstruction of depth data from the downsampled depth map using an enhancement filter, and causing determination of filter parameters of the enhancement filter and depth intensity values that maximize a quality of the reconstruction. The identified depth intensity values included in the downsampling parameters may be produced via this determination. Additionally or alternatively, the one or more downsampling parameters may further include the determined filter parameters.

In further embodiments, the method may include calculating a size of the compressed representation and a quality of the compressed representation, and, in an instance in which the calculated size fails to satisfy a size threshold or the calculated quality fails to satisfy a quality threshold, causing segmentation of a segment from the set of segments into sub-segments, causing further downsampling of the downsampled depth map based on the set of sub-segments, causing updating of the compressed representation based on the further downsampling, and re-calculating the size of the compressed representation and the quality of the compressed representation.

In some embodiments, the method may further include generating a binary tree to capture index information associated with the segmentation of the color image and the downsampled depth map. The compressed representation may include the generated binary tree. In some such embodiments, the method includes causing application of predictive and arithmetic coding to the downsampled depth map prior to causing storage of the compressed representation. In other embodiments, the method may include causing embedding of the downsampled depth map in the compressed representation. In one such embodiment, the method includes causing quantization of the color image by removing a set of least significant bits associated with the color image pixels. The downsampled depth map may be embedded in the quantized color image of the compressed representation.

In some embodiments of the method, the segmentation parameters and the downsampling parameters included in the compressed representation are located in a header of the compressed representation. In some embodiments of the method, the color image is segmented into the set of super-pixel segments via simple linear iterative clustering or super-pixel extraction via energy-driven sampling.

In another example embodiment, an apparatus is provided having at least one processor and at least one memory including computer program code with the at least one memory and the computer program code configured to, with the at least one processor, cause the apparatus to receive a 2D-plus-depth representation. The 2D-plus-depth representation includes a color image and an original depth map. The at least one memory and the computer program code are further configured to, with the at least one processor, cause the apparatus of this example embodiment to segment the color image into a set of super-pixel segments, and down-sample the original depth map based on the set of super-pixel segments. Moreover, the at least one memory and the computer program code may be configured to, with the at least one processor, cause the apparatus to generate a compressed representation based on the segmented color image and the downsampled depth map, and store the compressed representation. The compressed representation of this example embodiment includes segmentation parameters associated with the segmentation of the color image and downsampling parameters associated with the downsampling of the original depth map.

In some embodiments, downsampling of the original depth map may include identifying portions of the original depth map that correspond to segments of the set of super-pixel segments. For each identified portion of the original depth map, the at least one memory and the computer program code may be configured to, with the at least one processor, cause the apparatus to identify a depth intensity value, and modify the portion of the original depth map based on the identified depth intensity value. The one or more downsampling parameters may thus include the identified depth intensity values. In an instance in which the original depth map includes floating point data, identifying the depth intensity value may include applying a thin-plate spline fitting function to the portion of the original depth map.

The at least one memory and the computer program code may further be configured to, with the at least one processor, cause the apparatus to reconstruct depth data from the downsampled depth map using an enhancement filter, and determine filter parameters of the enhancement filter and depth intensity values that maximize a quality of the reconstruction. The identified depth intensity values included in the downsampling parameters may be produced via this determination. Additionally or alternatively, the one or more downsampling parameters may further include the determined filter parameters.

In further embodiments, the at least one memory and the computer program code may be configured to, with the at least one processor, cause the apparatus to calculate a size of the compressed representation and a quality of the compressed representation, and, in an instance in which the calculated size fails to satisfy a size threshold or the calculated quality fails to satisfy a quality threshold, the at least one memory and the computer program code may be configured to, with the at least one processor, cause the apparatus to segment one segment of the set of segments into sub-segments, further downsample the downsampled depth map based on the set of sub-segments, update the compressed representation based on the further downsampling, and re-calculate the size of the compressed representation and the quality of the compressed representation.

In some embodiments, the at least one memory and the computer program code may be configured to, with the at least one processor, cause the apparatus to generate a binary tree to capture index information associated with the segmentation of the color image and the downsampled depth map. The compressed representation may include the generated binary tree. In one such embodiment, the at least one memory and the computer program code may be configured to, with the at least one processor, cause the apparatus to apply predictive and arithmetic coding to the downsampled depth map prior to generation of the compressed representation. In other embodiments, the at least one memory and the computer program code may be configured to, with the at least one processor, cause the apparatus to embed the downsampled depth map in the compressed representation. In one such embodiment, the at least one memory and the computer program code may be configured to, with the at least one processor, cause the apparatus to quantize the color image by removing a set of least significant bits associated with the color image. The downsampled depth map may be embedded in the quantized color image of the compressed representation.

In some embodiments of the apparatus, the segmentation parameters and the downsampling parameters included in the compressed representation are located in a header of the compressed representation. In yet another embodiment, the at least one memory and the computer program code may be configured to, with the at least one processor, cause the apparatus to segment the color image into the set of super-pixel segments via simple linear iterative clustering or super-pixel extraction via energy-driven sampling.

In another example embodiment, a computer program product is provided that includes at least one non-transitory computer-readable storage medium having computer-executable program code portions stored therein with the computer-executable program code portions comprising program code instructions that, when executed, cause an apparatus to receive a 2D-plus-depth representation. The 2D-plus-depth representation may include a color image and an original depth map. The program code instructions, when executed, further cause the apparatus of this example embodiment to segment the color image into a set of super-pixel segments, and downsample the original depth map based on the set of super-pixel segments. Moreover, the program code instructions, when executed, further cause the apparatus of this example embodiment to generate a compressed representation based on the segmented color image and the downsampled depth map, and store the compressed representation. The compressed representation may include segmentation parameters associated with the segmentation of the color image and downsampling parameters associated with the downsampling of the original depth map.

In some embodiments, downsampling of the original depth map may include identifying portions of the original depth map that correspond to segments of the set of super-pixel segments. For each identified portion of the original depth map, the program code instructions, when executed, further cause the apparatus of one such embodiment to identify a depth intensity value, and modify the portion of the original depth map based on the identified depth intensity value. The one or more downsampling parameters may thus include the identified depth intensity values. In an instance in which the original depth map includes floating point data, identifying the depth intensity value may include applying a thin-plate spline fitting function to the portion of the original depth map.

The program code instructions, when executed, may further cause the apparatus to reconstruct depth data from the downsampled depth map using an enhancement filter, and determine filter parameters of the enhancement filter and depth intensity values that maximize a quality of the reconstruction. The identified depth intensity values included in the downsampling parameters may be produced via this determination. Additionally or alternatively, the one or more downsampling parameters may further include the determined filter parameters.

In further embodiments, the program code instructions, when executed, further cause the apparatus to calculate a size of the compressed representation and a quality of the compressed representation, and, in an instance in which the calculated size fails to satisfy a size threshold or the calculated quality fails to satisfy a quality threshold, the program code instructions, when executed, further cause the apparatus to further segment one segment from the set of segments into sub-segments, further downsample the downsampled depth map based on the set of sub-segments, update the compressed representation based on the further downsampling, and re-calculate the size of the compressed representation and the quality of the compressed representation.

In some embodiments, the program code instructions, when executed, further cause the apparatus to generate a binary tree to capture index information associated with the segmentation of the color image and the downsampled depth map. The compressed representation may include the generated binary tree. In one such embodiment, the program code instructions, when executed, further cause the apparatus to apply predictive and arithmetic coding to the downsampled depth map prior to generation of the compressed representation. In other embodiments, the program code instructions, when executed, further cause the apparatus to embed the downsampled depth map in the compressed representation. In one such embodiment, the program code instructions, when executed, further cause the apparatus to quantize the color image by removing a set of least significant bits associated with the color image. The downsampled depth map may be embedded in the quantized color image of the compressed representation.

In some embodiments of the computer program product, the segmentation parameters and the downsampling parameters included in the compressed representation are located in a header of the compressed representation. In yet another embodiment, the program code instructions, when executed, further cause the apparatus to segment the color image into the set of super-pixel segments via simple linear iterative clustering or super-pixel extraction via energy-driven sampling.

In another example embodiment, an apparatus is provided that includes means for receiving a 2D-plus-depth representation. The 2D-plus-depth representation may include a color image and an original depth map. The apparatus of an example embodiment further includes means for causing segmentation of the color image into a set of super-pixel segments, and means for causing downsampling of the original depth map based on the set of super-pixel segments. Moreover, the apparatus of an example embodiment further includes means for causing generation of a compressed representation based on the segmented color image and the downsampled depth map, and means for causing storage of the compressed representation. The compressed representation may include segmentation parameters associated with the segmentation of the color image and downsampling parameters associated with the downsampling of the original depth map.

In some embodiments, downsampling of the original depth map may include identifying portions of the original depth map that correspond to segments of the set of super-pixel segments. For each identified portion of the original depth map, the apparatus may include means for identifying a depth intensity value, and means for modifying the portion of the original depth map based on the identified depth intensity value. The one or more downsampling parameters may thus include the identified depth intensity values. In an instance in which the original depth map includes floating point data, identifying the depth intensity value may include applying a thin-plate spline fitting function to the portion of the original depth map.

The apparatus may further includes means for causing reconstruction of depth data from the downsampled depth map using an enhancement filter, and means for determining filter parameters of the enhancement filter and depth intensity values that maximize a quality of the reconstruction. The identified depth intensity values included in the downsampling parameters may be produced via this determination. Additionally or alternatively, the one or more downsampling parameters may further include the determined filter parameters.

In further embodiments, the apparatus further includes means for calculating a size of the compressed representation and a quality of the compressed representation, and, in an instance in which the calculated size fails to satisfy a size threshold or the calculated quality fails to satisfy a quality threshold, the apparatus may include means for causing segmentation of a segment from the set of segments into sub-segments, means for causing further downsampling of the downsampled depth map based on the set of sub-segments, means for causing updating of the compressed representation based on the further downsampling, and means for causing re-calculating the size of the compressed representation and the quality of the compressed representation.

In some embodiments, the apparatus further includes means for generating a binary tree to capture index information associated with the segmentation of the color image and the downsampled depth map. The compressed representation may include the generated binary tree. In one such embodiment, the apparatus further includes means for causing application of predictive and arithmetic coding to the downsampled depth map prior to generation of the compressed representation. In other embodiments, the apparatus further includes means for causing embedding of the downsampled depth map in the compressed representation. In one such embodiment, the apparatus further includes means for causing quantization of the color image by removing a set of least significant bits associated with the color image. The downsampled depth map may be embedded in the quantized color image of the compressed representation.

In some embodiments, the segmentation parameters and the downsampling parameters included in the compressed representation are located in a header of the compressed representation. In yet another embodiment, the apparatus may include means for segmenting the color image into the set of super-pixel segments via simple linear iterative clustering or super-pixel extraction via energy-driven sampling.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Having described certain example embodiments of the present disclosure in general terms above, reference will now be made to the accompanying drawings, which are not necessarily drawn to scale, and wherein:

FIGS. 15A-E illustrate an example series of images for edge border segmentation, in accordance with some example embodiments;

FIG. 16-16J provide a visual comparison of compression methods for a segment of a color image, in accordance with some example embodiments;

FIGS. 17A-17C illustrate the use of thin-plate splines to approximate segment depth data, in accordance with some example embodiments.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

Additionally, as used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

2D-Plus-Depth Data Format

Figure 1A:
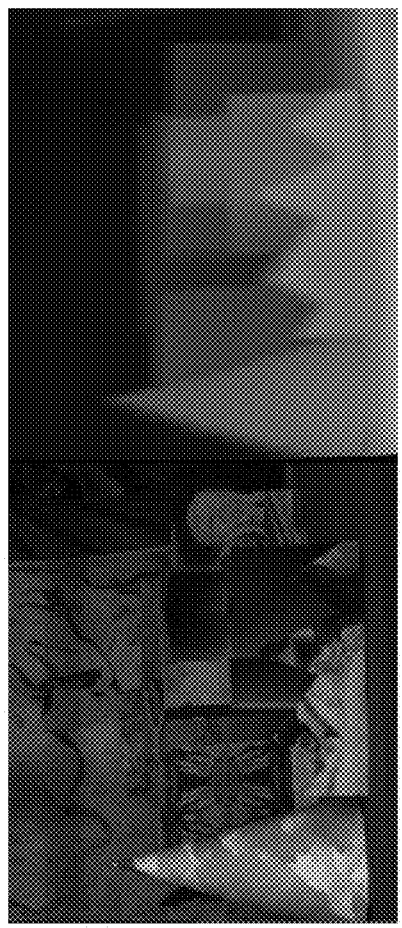
FIG. 1A illustrates an example 2D-plus-depth representation, in accordance with an example embodiment of the present invention.

As noted previously, a 2D-plus-depth representation includes a greyscale depth map side-by-side with a 2D color image, so that each pixel of the 2D color image has a corresponding depth value stored in the same pixel position on the corresponding depth map. FIG. 1A represents an example 2D-plus-depth representation. A virtual view rendered out of this representation is shown in FIG. 1B. The world coordinates (x, v, z) of each point in the 3D image can be computed using the view parameters (camera intrinsic parameters). For instance, if (u, v) denotes the regular coordinates of a pixel on the image plane, the depth value of the pixel is d(u, v). The world coordinates (x, y, z) are calculated as follows:

$$z = d(u,v) z = f \times d(u,v) / \sqrt{f^2 + u^2 + v^2}$$

$$x = u \times z/f, y = v \times z/f, w = 1 \quad (2)$$

where f is the focal length of capturing device.

A virtual view is synthesized given the relative transformation between the initial and the targeted view. The point p(x, y, z) is transformed as follows:

$$(u,v,w)_{view} = K \times RT \times (x,y,z,1)^T \quad (3)$$

where RT is the relative transformation matrix between the initial and the generated view, and K specifies intrinsic parameters of this view. Finally, the RGB image coordinates in non-uniform grid defined by $(u,v)_{view}$ are given by the normalized coordinates (divided by w).

The resulting irregular depth samples are then mapped with the corresponding values of d(u,v):

$$d(u',v')_{view} = d(u,v) - T(3) \quad (3.1)$$

The non-uniform data given by $(u',v')_{view}$ should be resampled to the coordinate pixel grid by a resampling function.

Depth Maps for Horizontally Shifted Views

Figure 1C:
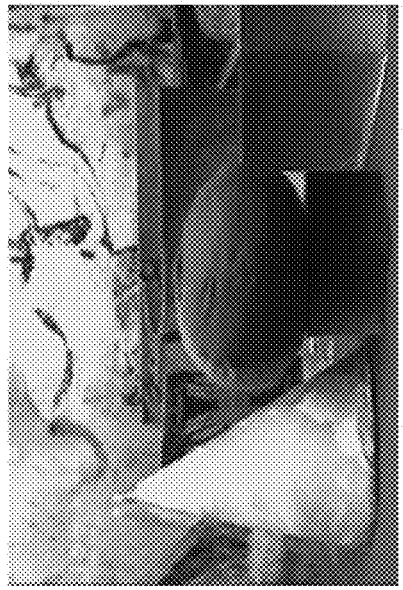
FIG. 1C illustrates an example of eight horizontally shifted and equally spaced stereoscopic views rendered for a single 2D-view-plus-depth representation for the needs of an auto-stereoscopic display in accordance with an example embodiment of the present invention.
Figure 1B:
FIG. 1B illustrates a virtual view rendered out of the representation of FIG. 1A, in accordance with an example embodiment of the present invention.

In the particular case of view-rendering content as depicted in FIG. 1C for auto-stereoscopic displays, Equation 3 above can be simplified to the following pixel mapping function:

$$(u, v)_{view} = (u, v + \Delta v), \Delta v = \frac{Bf}{Nd(u, v)}, f = \frac{V}{2}\cot\left(\frac{FoV}{2}\right)^{-1}, \quad (4)$$

where V represents the pixel width size of the display, FoV represents the display field of view (or display parallax view), N represents the number of auto-stereoscopic views, and where cot comprises the cotangent operator. A generated output on an auto-stereoscopic screen is depicted in FIG. 1C. The benefit of this mapping is that it avoids a resampling step, because the mapping function returns coordinates in a pixel grid.

Disparity Maps

Equation 4 estimates the horizontal shift (e.g., disparity) of each pixel that corresponds to a rendering position in the generated view. For that reason, the depth data can be preferably stored as a map of disparities within a quantized range of values (e.g., in fixed-point 8-bit format having 256 disparity values). As can be observed from Equation 4, the relationship between disparity and depth is non-linear. In other words, different values of depths result in different disparity shifts. Nevertheless, 256 gray levels are considered sufficient for representing perceptually-adequate binocular disparities for given display sizes, as typical disparity ranges are around 60 levels.

Quantized Depth Maps

Depth maps can also be stored in 8-bits (quantized in 256 values). Thus, both disparity and depth maps can be represented conveniently in a file format used for color or grayscale images (e.g. bitmap (BMP) format, portable network graphics (PNG) format, or the like), as detailed in D. Scharstein and R. Szeliski, "A taxonomy and evaluation of dense two-frame stereo correspondence algorithms," in Int. J. of Computer Vision, Vol. (47)1/2/3, pp. 7-42, April, 2002. The following Equation 5 gives the relation between a depth map value and the resulting disparity value:

$$D(Z) = M\left(1 - \frac{V_z}{Z - Z_d + V_z}\right) + C, \quad (5)$$

where Z represents depth, D(Z) represents a disparity function, M represents a linear function multiplier, $Z_d$ represents a depth of display plane, $V_z$ represents a view distance in coordinate units, and C represents a linear function constant. Table 1 illustrates an example of parameter selection that for view distance of $V_z=7.65$ m, the data is quantized in 8-bit map without visually distinguishable differences.

TABLE 1

Auto-Stereoscopic Parameters For 8-bit Data Quantization

| Parameter | $Z_d$ | $V_z$ | M | C |
|---|---|---|---|---|
| Value | 0.467481 | 7.6551192 | −1960.37 | 127.5 |

Figure 2A:
FIG. 2A illustrates a 3D color image, in accordance with some example embodiments.
Figure 2B:
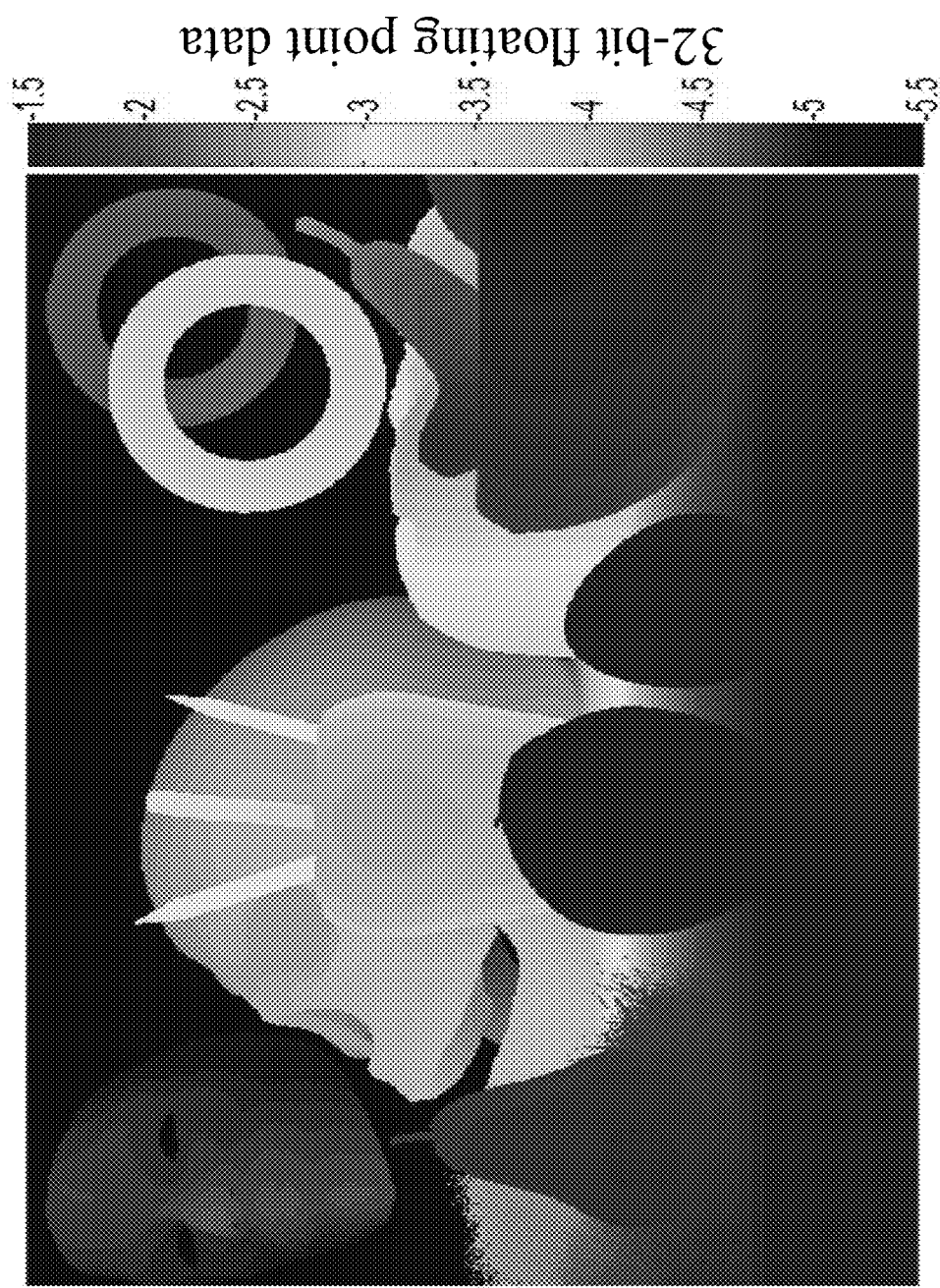
FIGS. 2B and 2C illustrate changes from quantizing a depth map associated with the color image of FIG. 2A, in accordance with some example embodiments.
Figure 2C:
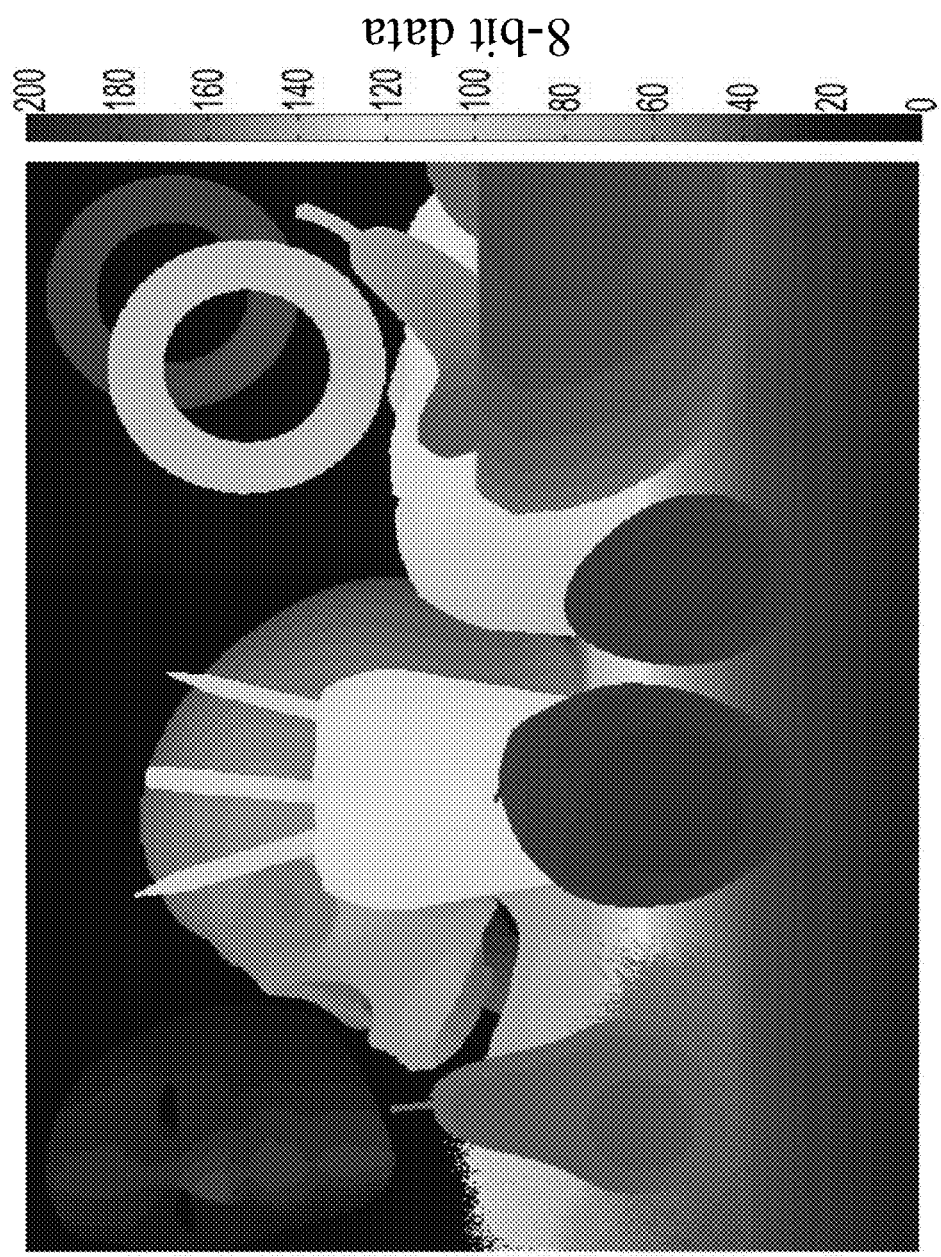

An illustration of the change in a depth map from quantizing depth for auto-stereoscopic display visualization can be understood with reference to FIGS. 2A through 2C. FIG. 2A illustrates a scene, while FIG. 2B illustrates its original depth image (with a range of [1-5.3]m, floating point), and FIG. 2C illustrates the quantized output by Equation 5 above in 8-bit data map (0-255).

Floating Point Depth Maps

In some applications, such as 3D modeling, computer graphics based rendering, N-to-M view rendering, range scanning by structured light, or the like, the depth map is preferably represented with floating point precision. A typical format for storing such floating-point depth data maps is OpenEXR (EXR).

Image Data Segmentation Using Super-Pixels

Image segmentation is a technique that partitions image into segments grouping data of similar cues: color, pattern, or texture. Super-pixels are sets of pixels that have regular and compact representations with low-computational overhead. This means that a typical super-pixel behaves as a raster pixel with a more natural representation. The information in the area of a super-pixel has perceptually meaningful properties in terms of color and/or texture. An example produced by a super-pixel clustering algorithm is shown in FIG. 3A, where natural behavior of a segmented area is demonstrated. Algorithms that generate super-pixels can be classified in two main approaches: SLIC (Simple Linear Iterative Clustering) algorithms, as described in X. Ren and J. Malik, "Learning a classification model for segmentation," in Proc. 9th Int. Conf. Computer Vision, volume 1, pages 10-17, 2003; and SEEDS (Superpixels Extracted via Energy-Driven Sampling) algorithms, as described in M. Bergh, X. Boix, G. Roig, B. Gool, "SEEDS: Superpixels Extracted via Energy-Driven Sampling", in Proceedings of the 12th European Conference on Computer Vision (ECCV), October 2012.

Figure 3B:
FIGS. 3A and 3B illustrate segmentation of a color image, and further refinements of the initial segmentation, respectively, in accordance with some example embodiments.
Figure 3A:

An example embodiments of the present invention may utilize super-pixel segmentation to exploit the following properties:

1) Each super-pixel can be refined into several smaller segments (for instance, see FIG. 3B, illustrating further refinements to the super-pixels illustrated in FIG. 3A)

There are algorithm realizations for super-pixel segmentation that produce the same segmented result given the same initial parameters and in the same order of segmentation index, as described in R. Achanta, A. Shaji, K. Smith, A. Lucchi, P. Fua, and S. Süsstrunk, "SLIC Superpixels," Ecole Polytechnique Federale de Lausanne, EPFL Technical Report 149300 (June 2010) 1-15. This fact allows a simplified indexing of segments and their refined versions.

3) There are super-pixel applications that do not require additional parameters, but only the desired number of pixels.

Figure 4:
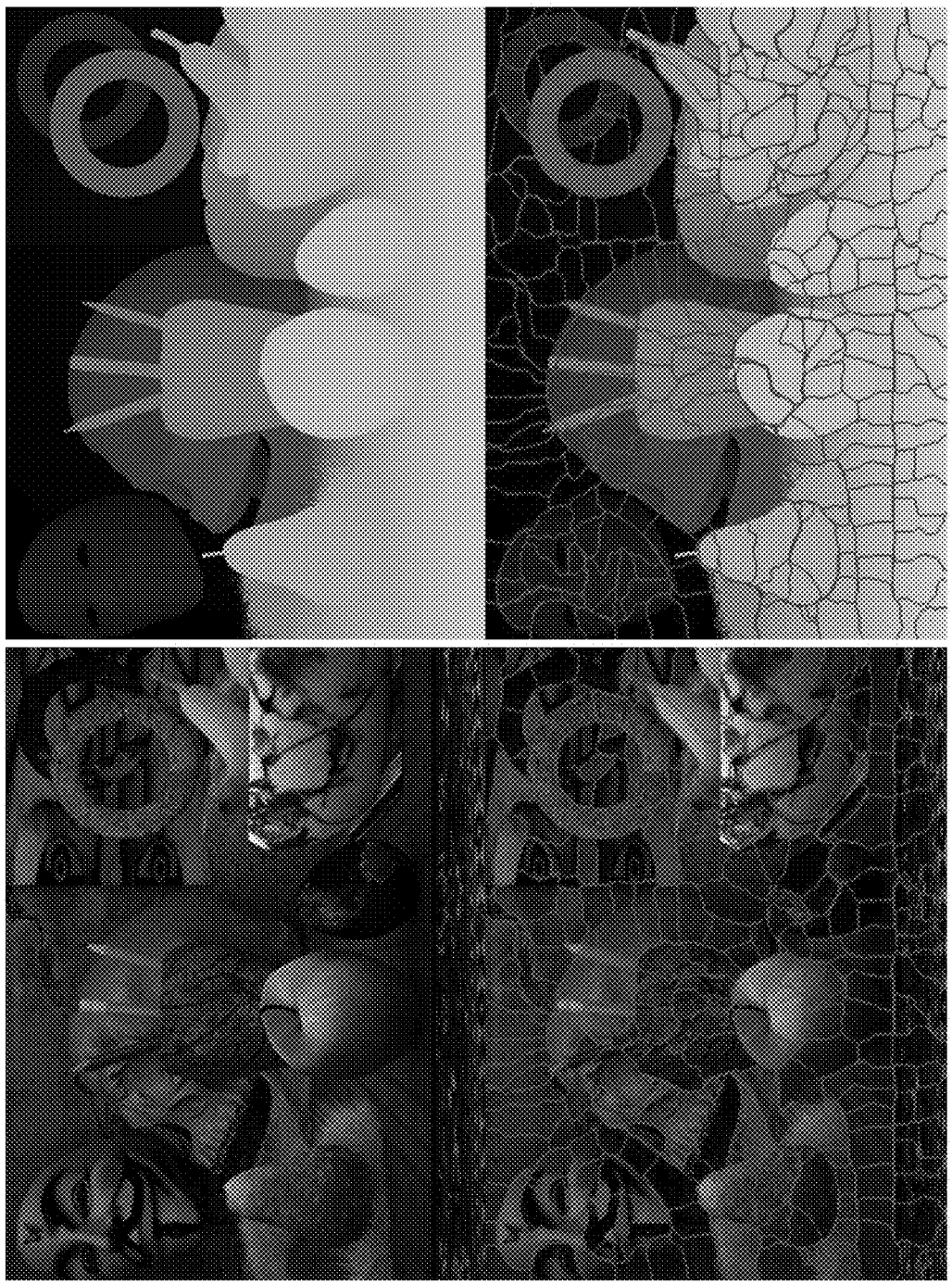
FIG. 4 illustrates a color image, its depth modality, super-pixel clustering on the color data, and corresponding locations drawn on the depth data, in accordance with some example embodiments.

4) Super-pixels follow the edge shape between color textures, which usually also defines edges between objects in a scene (as illustrated, for example, in FIG. 4, which illustrates a color image, its depth modality, super-pixel clustering on the color data, and corresponding locations drawn on the depth data).

5) Super-pixels also behave as normal pixels but with a more natural representation.

6) Super-pixels demonstrate low computational overhead, easy algorithm parallelization, and single central processing unit (CPU) real-time implementation.

Arithmetic Data Coding

Entropic (or arithmetic) data coding is a lossless data compression approach of a sequence of symbols. A standard approach is to represent each symbol by several binary bits, where frequently used characters utilize smaller binary length. An example approach is proposed in Huffman, D. "A Method for the Construction of Minimum-Redundancy Codes", in Proceedings of the IRE Vol (40) 9 pp. 1098-1101, 1952.

Predictive Data Coding

Predictive data coding is a lossless data compression approach using the information given by a predictive model (e.g., the linear predictive model detailed in Ziv, J.; Lempel, A. (1978). "Compression of individual sequences via variable-rate coding", in IEEE Transactions on Information Theory Vol (24)5, p. 530, 1978 [14]).

Enhancing Filter of Depth Data Based on Joint Bilateral Filtering

Figures 5A, 5B, 5C:
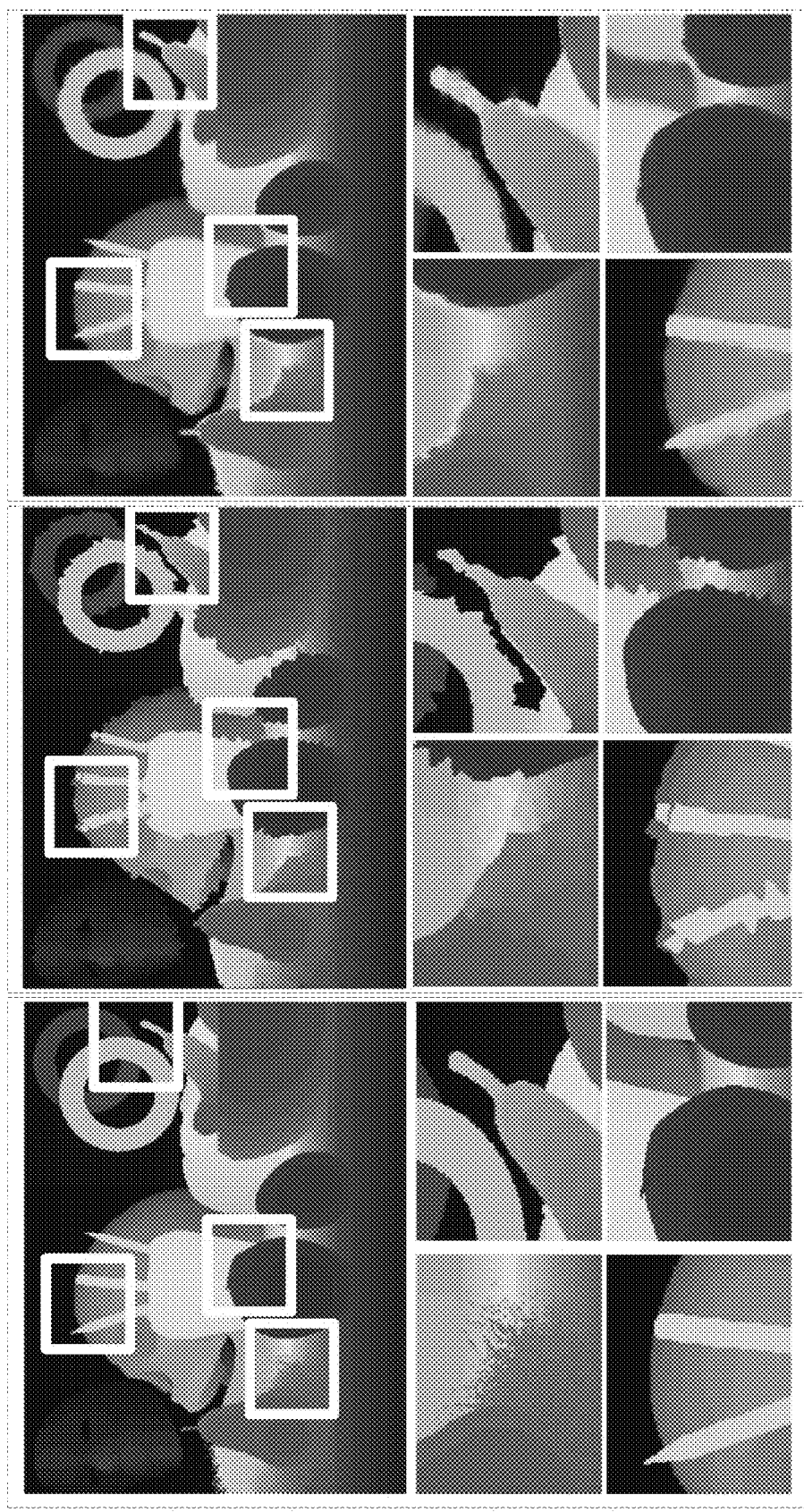
FIGS. 5A-5C illustrate the enhancing effect of applied color-joint bilateral filter on depth data, in accordance with some example embodiments.

Classical bilateral filter uses range and neighborhood weights applied on the color modality, as discussed in C. Tomasi, R. Manduchi, "Bilateral Filtering for Gray and Color Images", Proceedings of the IEEE International Conference on Computer Vision 1998, Vol (1), pp. 839-847, 1998. Joint (cross) bilateral filtering operates on depth images using weights from the aligned color image, as discussed in Y Qingxiong, Y Ruigang, J Davis, D Nister, Spatial-depth super resolution for range images. *IEEE Conference on Computer Vision and Pattern Recognition (CVPR 2007)* (IEEE Computer Society, Minneapolis, Minn., 2007), pp. 1-8:

$$D(j) = \frac{1}{W(j)} \sum_{r \in R} \exp\left(\frac{\|j-r\|}{2\sigma_r}\right) \exp\left(\frac{\|C(j)-C(r)\|}{2\sigma_d}\right) Z(r) \quad (6)$$

$$W(j) = \sum_{r \in R} \exp\left(\frac{\|j-r\|}{2\sigma_r}\right) \exp\left(\frac{\|C(j)-C(r)\|}{2\sigma_d}\right)$$

where W(j) represents a normalization weight term, D(j) represents a filtered output, j represents a filtered pixel position, R represents a neighborhood of pixel positions, C represents a colormap, and $\sigma_r$ and $\sigma_d$ represent parameters controlling the span of the smoothing kernels. Such filters preserve depth edges and align them to edges of the color image. Depth enhancement effect is achieved based on the color weighting. An example of such an effect is illustrated in FIGS. 5A through 5C, which illustrate the enhancing effect of applied color-joint bilateral filter on depth data: FIG. 5A shows the original data, FIG. 5B shows a depth map estimated by initial segmentation, and FIG. 5C shows enhanced output. This example is evaluated in Table 2.

Table 2 illustrates a comparison of the approach presented herein with several state-of-the-art lossy data compression algorithms that do not utilize the complementary color information while compressing depth maps. The results for different compression schemes show that the spatial downsampling based compression concept described herein results in smaller data size for similar quality. Further optimizations (initial segmentation, refinement levels, depth modeling, reconstruction (enhancing) filtering, and border refinement) can lead to even better results.

One observation is that a downsampled output of just 300 bytes that is post-processed by an enhancing filter gives a good visual result (as shown in FIG. 16E). For this level of quality, the data can be saved in a header as metadata in which case no utilization of arithmetic coding and (steganographic) storing in position of least-significant bits is needed. The calculated size of the coding tree is given in Table 2. Visual comparison is given in FIG. 15.

TABLE 2

Downsampling Performance of Different Methods

| Bits per pixel | 0.002 | 0.005 | 0.01 | 0.05 | 0.075 | 0.1 | 0.15 |
|---|---|---|---|---|---|---|---|
| JPEG | — | — | — | 27.6 | 34.3 | 36.2 | 40.6 |
| JPEG2000 | — | — | 30.0 | 38.2 | 40.7 | 42.7 | 45.6 |
| ADCTC** | — | 25.5 | 29.7 | 39.8 | 42.5 | 44.7 | 47.7 |
| Ponomarenko, Gotchev*** | — | 30.3 | 33.3 | 35.2 | 41.9 | 43.1 | 43.5 |
| Ours* | 29.74 | 33.45 | 35.91 | 41.79 | — | 44.88 | 45.88 |

*Tree size included
**N. Ponomarenko, V. Lukin, K. Egiazarian, J. Astola, "ADCTC: Advanced DCT-Based Image Coder," in Proceedings of LNLA, Switzerland, August 2008.
***N. Ponomarenko, V. Lukin, A. Gotchev, Karen Egiazarian, "Intra-frame depth image compression based on anisotropic partition scheme and plane approximation", in IEEE Immerscom '09, May 2009.

RGB to YUV Color Space Data Conversion

YUV is a color space typically used as part of a color image processing pipeline. Transformation from RGB to YUV space allows encoding of a color image or video while taking human perception into account. That is, the chrominance components of the image data are downsampled to reduce the bandwidth of the representation. Transmission errors or compression artifacts in chrominance components are effectively masked by the deficiencies in human perception. A conversion of RGB to YUV color space is considered as lossy even for the same bit conversion rate. FIG. 6B and FIGS. 7A through 7C present examples in which at least two least significant bits per channel are omitted for seamless visual appearance when image data is transformed among YUV and RGB color space. FIGS. 7A through 7C illustrate the lost color information after RGB→YUV→RGB color conversion for the red channel, green channel, and blue channel, respectively.

Figure 6A:
FIGS. 6A-6C illustrate a single image that has been stored in three separate forms with varying least significant bits of the red color channel, in accordance with some example embodiments.
Figure 6B:
Figures 7A, 7B, 7C:
FIGS. 7A-7C illustrate red, green, and blue color channels, respectively, after RGB→YUV→RGB color conversion, in accordance with some example embodiments.

The image in FIG. 6B is given as an example to establish that two least significant bits per channel can be omitted for seamless visual appearance when image data is transformed from RGB into YUV color space. For example, in a full HD RGB image (1920×1080×3 pixels), at least 777 kilobytes of data can be utilized for other purposes instead of color visualization without a perceivable reduction in image quality.

Thin-Plate Splines

The name "Thin Plate Spline" (TPS) refers to a physical analogy involving the bending of a thin sheet of metal by hitting with rounded object, as detailed in F. Bookstein, "Principal warps: Thin-Plate Splines and the Decomposition of Deformations", published in IEEE Transactions on Pattern Analysis and Machine Intelligence, Vol (11), No. 6, June 1989. Given a set of data points (control points), a weighted combination of thin plate spline bases centered about each data point gives the interpolation function that passes through the points exactly while minimizing the so-called "bending energy" criterion. A thin-plate spline uses kernels of radial basis functions:

$$f(x)=\Sigma_{i=1}^{K}c_i\phi(\|x-w_i\|), \quad (7)$$

where $c_i$ represents a set of mapping coefficients, $w_i$ represents control points, and $\phi$ represents a TPS basis kernel that corresponds to the radial function:

$$\phi(r)=r^2 \log r. \quad (8)$$

Binary Tree Coding

Figure 8:
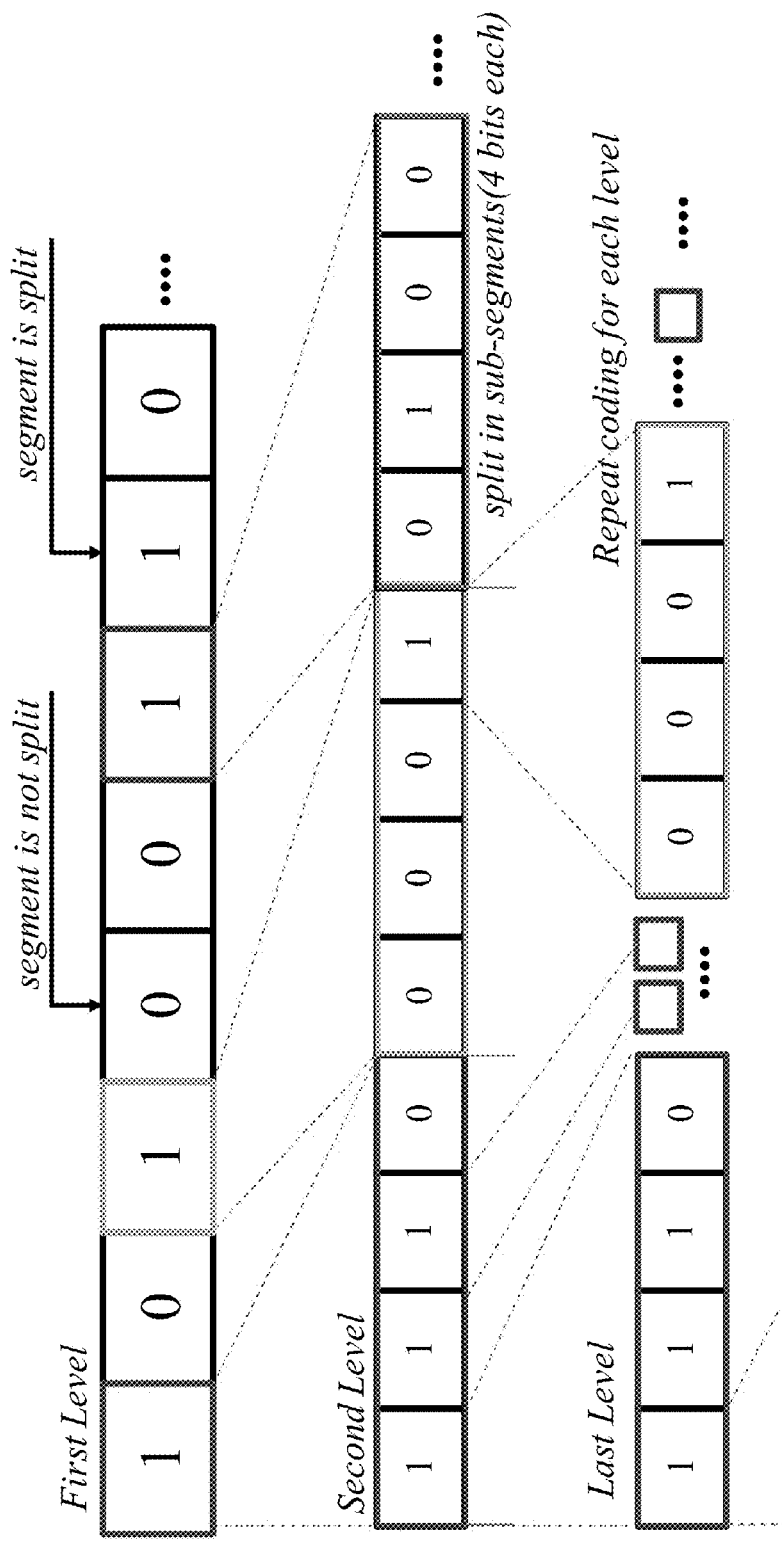
FIG. 8 illustrates an example data structure indexing super-pixel segments of a color image, in accordance with some example embodiments.
Figure 8A:
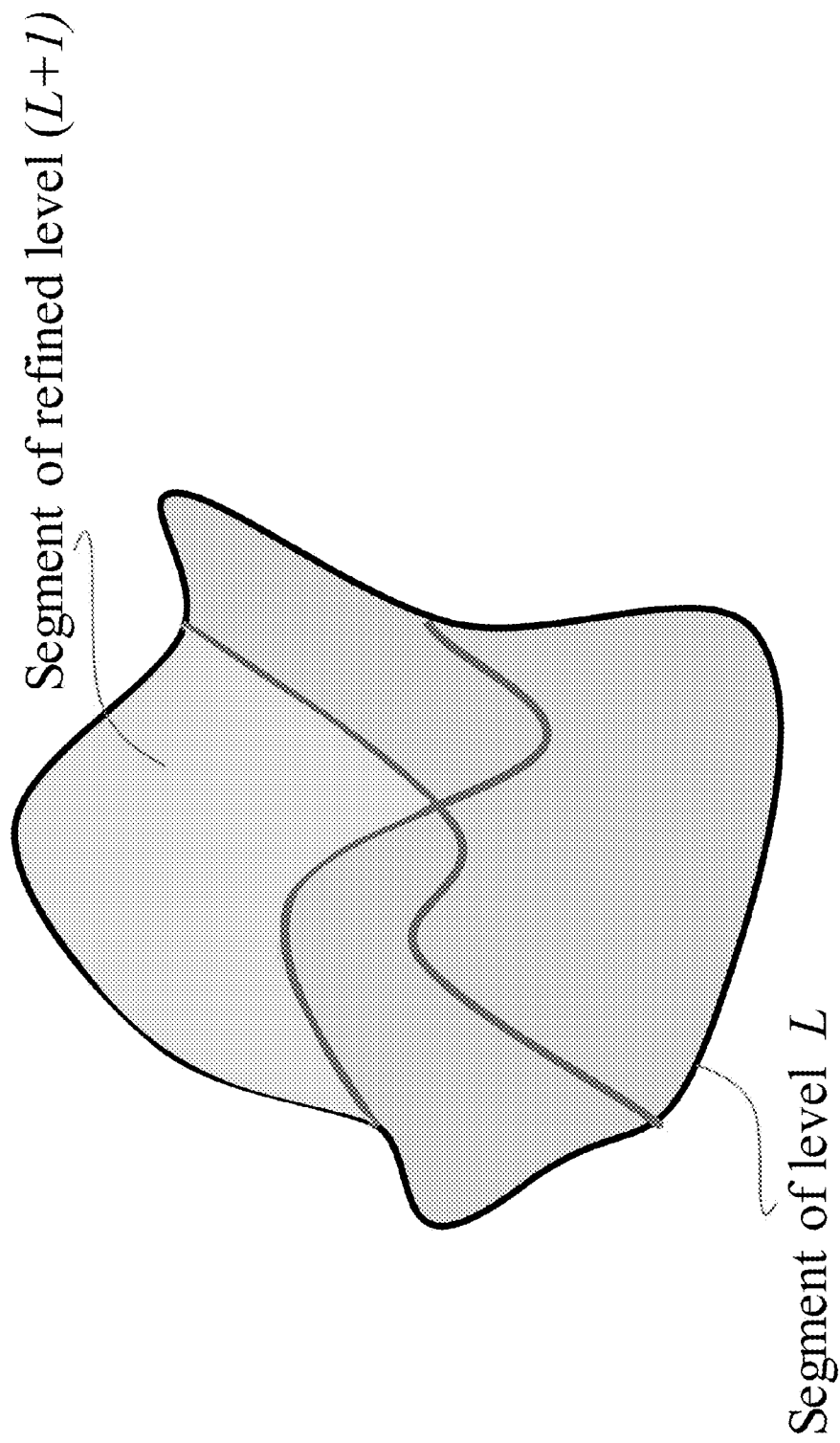
FIG. 8A illustrates an example segment of level L of a binary tree, wherein the segment is further split into four sub-segments for a refined level (L+1) of the binary tree, in accordance with some example embodiments.

Embodiments of the present invention implement an indexing approach similar to a "quadtree" (a tree data structure wherein each node with children has exactly four children). An example binary tree data structure for indexing super-pixel segments of the color image is shown in FIG. 8. The binary tree consists of several levels L. The first level contains a sequence of binary bits corresponding to the number of segments N in the initial segmentation (e.g., N=256). Each bit position corresponds to the index of segment given by the segmentation algorithm. If the value of the bit is equal to 1, the segment of the corresponding index is refined and split into M sub-segments (e.g., M=4). For example, FIG. 8A illustrates an example segment of level L that is split into four sub-segments for a refined level (L+1). The segments of a given level L that are split define the next level of the tree, where the split sub-segments are indexed in the same order as at the initial level, but avoiding elements that have no splitting flag. The sub-segments are placed in the order given by the segmentation algorithm. In the same manner, every level of the tree will further refine the segments or sub-segments in the level above that have been split.

The depth values may be stored in the same order as the non-split segments starting from the first to the last level. If the bits in a segment on the lowest level of the tree represent a 1, the segment is not split further, but all pixel data in the segment is stored, where pixels are ordered by their index in the color image.

Quantized Depth Data Compression

A standard practice is to use lossy (e.g., joint photographic experts group (JPEG)) or lossless (e.g., PNG) data formats. Comparing the two modalities (e.g., the color and depth of the same scene), the lossless compression will "squeeze" the amount of depth data about 2-4 times better than for the color modality of the same scene. One example size comparison of color and quantized depth modality is shown in the scene illustrated in FIGS. 3A and 3B, when files are stored in PNG format for maximum compression parameters: color (RGB)—439 KB, depth (grayscale)—34.3 KB. The latter shows a compression gain of about ~3.5 times.

Implementation Overview

As mentioned above, an example embodiment of the present invention provides 2D-plus-depth representation compression based on spatial downsampling of a given depth map. An example embodiment disclosed herein utilizes structural information from the accompanying color data to rebuild a depth map similar to the original one. As noted previously, super-pixel segmentation of the color image may guide the selection of a depth value for each segment that maintains the best image quality, as described in greater detail below. The depth value selection is done within the loop of a depth-enhancing joint-bilateral filter aimed at improving quality and increasing compression performance. Filter parameters are optimized within the same loop. The decimated depth map is handled by predictive and arithmetic coding. In some embodiments, an iterative segmentation handles possible depth sensing artifacts that do not coincide accurately with scene objects.

The resulting downsampled depth map, after compression, requires very little storage space, which can be embedded as metadata in a header file or in place of perceptually insignificant color data (a steganographic type of data embedding). The latter mechanism produces jointly compressed view-plus-depth data that is similar in size to compressed color-only data without any perceivable loss of quality while also including additional geometrical information suitable for 3D applications.

The methods, apparatuses, and computer program products provided herein are applicable for various geometry representation modes, including disparity, quantized depth, and floating-point depth, and are suitable for many applications, such as watermarking and steganography that could preserve depth modality data by image cropping or mild lossy compression.

Figure 6C:

Turning now to FIGS. 6A through 6C, a single image is shown that has been stored in three separate formats. FIG. 6A illustrates a 439 kilobyte (KB) original image in PNG format. FIG. 6B illustrates a 428 KB PNG version of the image that has undergone RGB→YUV→RGB conversion. In turn, FIG. 6C illustrates a 439 KB PNG version of the original image that has been processed according to an embodiment of the present invention, and which thus also includes embedded depth data.

Figure 9B:
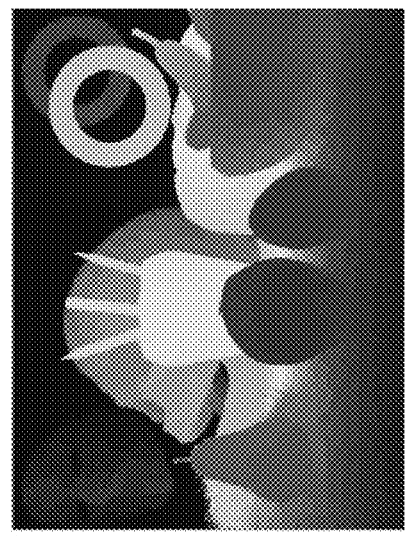
FIGS. 9A-9D illustrate the extraction of embedded depth information from a color image, in accordance with some example embodiments.
Figure 9C:
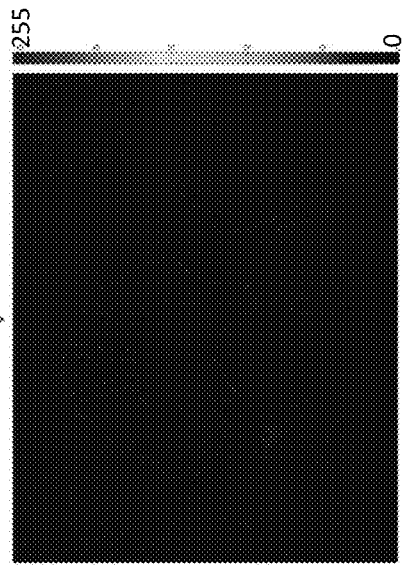
Figure 9A:
Figure 9D:
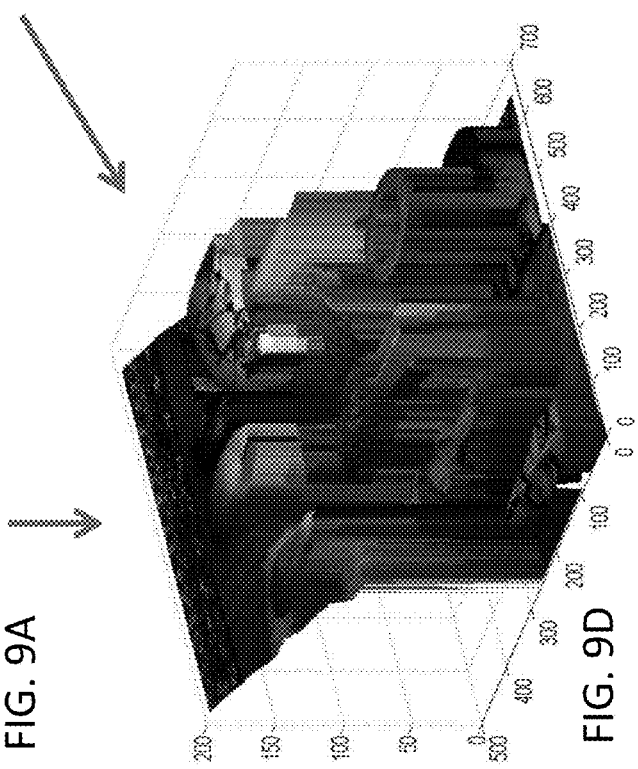

When comparing the images in FIGS. 6A and 6C, the images show similar visual output with undistinguishable color differences and the same compressed file size (~439 KB), but the image in FIG. 6C also contains quantized depth modality suitable for 2D-plus-depth rendering applications. FIGS. 9A through 9D illustrate the extraction of hidden depth information embedded in a color image, such as that shown in FIG. 6C. In this regard, FIG. 9A illustrates the color image itself. FIG. 9B illustrates the embedded depth map. FIG. 9C illustrates a map of absolute differences between the encoded depth map and Ground Truth. Finally, FIG. 9D illustrates a 3D data representation based on a color image encoding depth map data, such as that shown in FIG. 6C. In the particular example shown in FIG. 9D, this representation is generated using Matlab's azimuth perspective. The original color data of FIG. 6A and the color data of the modified representation shown in FIG. 6C differ only by their least significant bit (e.g., the red channel).

In the examples shown in FIG. 6C, the embedded depth data is arithmetically encoded by just 1300 8-bit samples. These samples reconstruct a dense depth map by filling areas defined by each image segment by a depth value of one or several samples. The image segments are obtained by applying a super-pixel segmentation algorithm, the type and parameters of which are stored in the metadata of the file header. The indices of the segmentation regions are stored in a binary coding tree of size 40 bytes, the parameters of which are also stored in the metadata of the file header. The resulting depth map is very similar to Ground-Truth (GT), as depicted in FIG. 9D.

System Architecture

A method, apparatus, and computer program product are provided in accordance with an example embodiment of the present invention for compressing 2D-plus-depth representations while substantially preserving three dimensional image quality. The method, apparatus, and computer program product may be embodied by any of a variety of devices. For example, the devices may include any of a variety of mobile terminals, such as a portable digital assistant (PDA), mobile telephone, smartphone, mobile television, gaming device, laptop computer, camera, tablet computer, video recorder, web camera, or any combination of the aforementioned devices. Additionally or alternatively, the computing device may include fixed computing devices, such as a personal computer or a computer workstation. Still further, the method, apparatus, and computer program product of an example embodiment may be embodied by a networked device, such as a server or other network entity, configured to communicate with one or more devices, such as one or more client devices.

Figure 10:
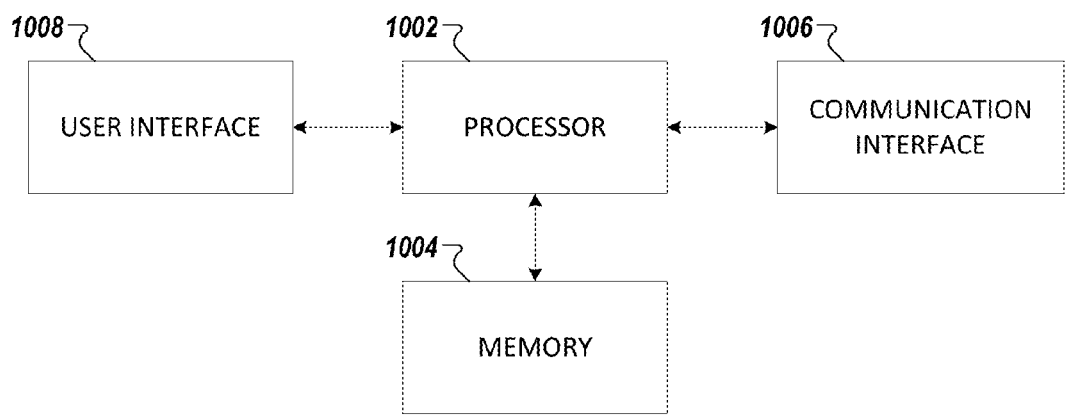
FIG. 10 illustrates an example apparatus configured to compress 2D-plus-depth representations, in accordance with some example embodiments.

Regardless of the type of device, an apparatus 1000 that may be specifically configured to compress 2D-plus-depth representations in accordance with an example embodiment of the present invention is illustrated in FIG. 10. It should be noted that while FIG. 10 illustrates one example configuration, numerous other configurations may also be used to implement embodiments of the present invention. As such, in some embodiments, although elements are shown as being in communication with each other, hereinafter such elements should be considered to be capable of being embodied within the same device or within separate devices.

Referring now to FIG. 10, the apparatus 1000 may include or otherwise be in communication with a processor 1002, a memory 1004, and optionally a communication interface 1006 and a user interface 1008. The apparatus 1000 may be embodied by a computing device, such as a computer terminal. However, in some embodiments, the apparatus may be embodied as a chip or chip set. In other words, the apparatus 1000 may comprise one or more physical packages (e.g., chips) including materials, components, and/or wires on a structural assembly (e.g., a baseboard). The structural assembly may provide physical strength, conservation of size, and/or limitation of electrical interaction for component circuitry included thereon. The apparatus 1000 may therefore, in some cases, be configured to implement an embodiment of the present invention on a single chip or as a single "system on a chip." As such, in some cases, a chip or chipset may constitute means for performing one or more operations for providing the functionalities described herein.

The processor 1002 may be embodied in a number of different ways. For example, the processor 1002 may be embodied as one or more of various hardware processing means such as a co-processor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 1002 may include one or more processing cores configured to perform independently. A multi-core processor may enable multiprocessing within a single physical package. Additionally or alternatively, the processor 1002 may include one or more processors configured in tandem via the bus to enable independent execution of instructions, pipelining, and/or multithreading.

In an example embodiment, the processor 1002 may be configured to execute instructions stored in the memory device 1004 or otherwise accessible to the processor 1002. Alternatively or additionally, the processor 1002 may be configured to execute hard-coded functionality. As such, whether configured by hardware or software methods, or by a combination thereof, the processor 1002 may represent an entity (e.g., physically embodied in circuitry) capable of performing operations according to an embodiment of the present invention while configured accordingly. Thus, for example, when the processor 1002 is embodied as an ASIC, FPGA, or the like, the processor 1002 may be specifically configured hardware for conducting the operations described herein. Alternatively, as another example, when the processor 1002 is embodied as an executor of software instructions, the instructions may specifically configure the processor 1002 to perform the algorithms and/or operations described herein when the instructions are executed. However, in some cases, the processor 1002 may be a processor of a specific device (e.g., a mobile terminal) configured to employ an embodiment of the present invention by further configuration of the processor by instructions for performing the algorithms and/or operations described herein. The processor 102 may include, among other things, a clock, an arithmetic logic unit (ALU), and logic gates configured to support operation of the processor 1002.

In some embodiments, the processor 1002 (and/or co-processor or any other processing circuitry assisting or otherwise associated with the processor) may be in communication with the memory 1004 via a bus for passing information among components of the apparatus. The memory 1004 may be non-transitory and may include, for example, one or more volatile and/or non-volatile memories. In other words, for example, the memory 1004 may be an electronic storage device (e.g., a computer readable storage medium) comprising gates configured to store data (e.g., bits) that may be retrievable by a machine (e.g., a computing device like the processor). The memory 1004 may be configured to store information, data, content, applications, instructions, or the like, for enabling the apparatus to carry out various functions in accordance with an example embodiment of the present invention. For example, the memory 1004 could be configured to buffer input data for processing by the processor 1002. Additionally or alternatively, the memory 1004 could be configured to store instructions for execution by the processor 1002.

Meanwhile, the communication interface 1006 may be any means such as a device or circuitry embodied in either hardware or a combination of hardware and software that is configured to receive and/or transmit data from/to a network and/or any other device or module in communication with the apparatus 1000. In this regard, the communication interface 1006 may include, for example, an antenna (or multiple antennas) and supporting hardware and/or software for enabling communications with a wireless communication network. Additionally or alternatively, the communication interface 1006 may include the circuitry for interacting with the antenna(s) to cause transmission of signals via the antenna(s) or to handle receipt of signals received via the antenna(s). In some environments, the communication interface 1006 may additionally or alternatively support wired communication. As such, for example, the communication interface 1006 may include a communication modem and/or other hardware/software for supporting communication via cable, digital subscriber line (DSL), universal serial bus (USB), or other mechanisms.

In some embodiments, the apparatus 1000 may include a user interface 1008 that may, in turn, be in communication with processor 1002 to provide output to the user and, in some embodiments, to receive an indication of a user input. As such, the user interface 108 may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone, and/or the like. The processor 1002 and/or user interface circuitry comprising the processor may be configured to control one or more functions of one or more user interface elements through computer program instructions (e.g., software and/or firmware) stored on a memory accessible to processor 1002 (e.g., memory 1004, and/or the like).

System Operations

Figure 11:
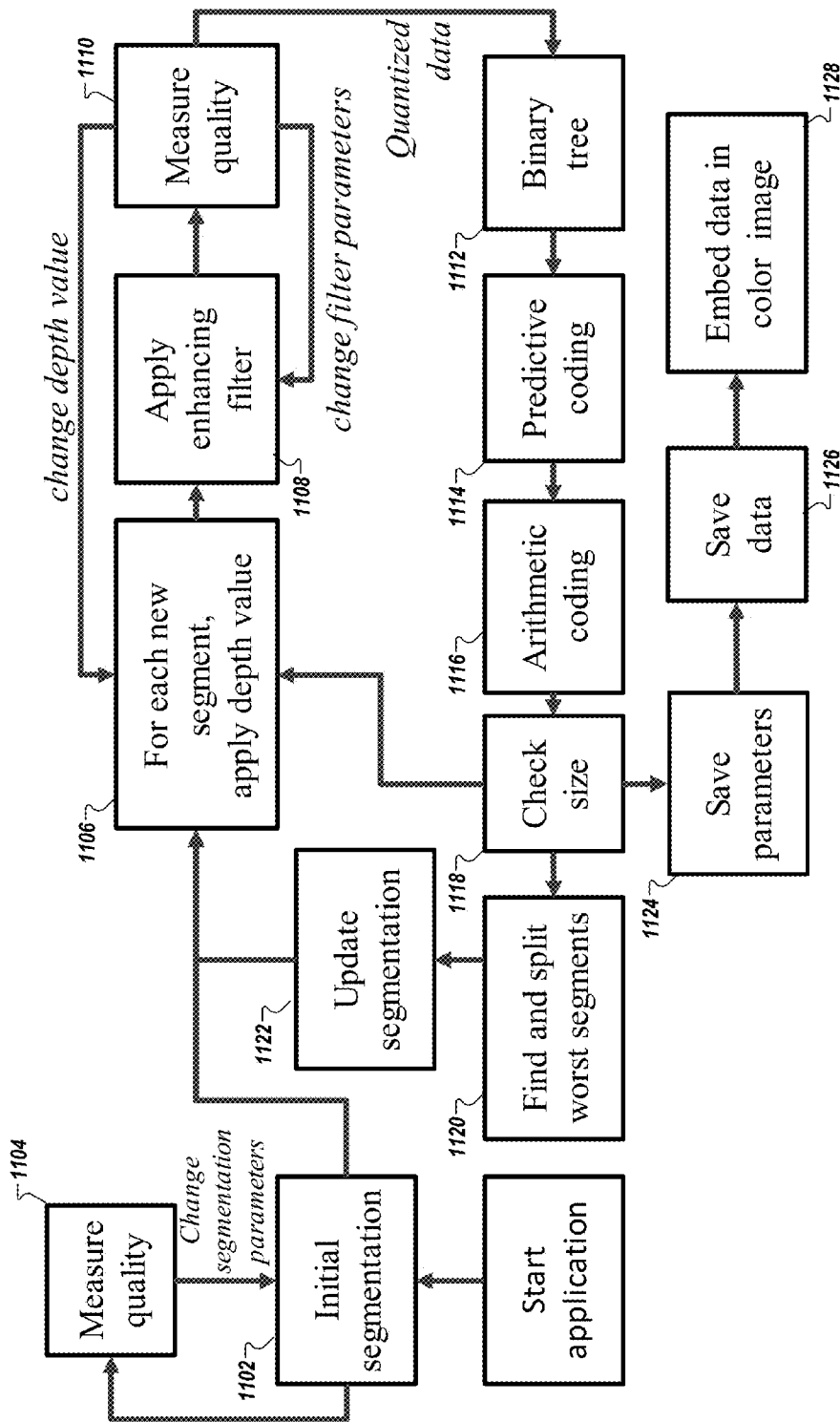
FIG. 11 illustrates an example flowchart containing operations for compressing 2D-plus-depth representations, in accordance with some example embodiments.

FIG. 11 illustrates a flowchart containing a series of operations performed to receive a 2D-plus-depth representation and generate and store a corresponding compressed representation. The operations illustrated in FIG. 11 may, for example, be performed by, with the assistance of, and/or under the control of apparatus 1000, and more particularly through the use of one or more of processor 1002, memory 1004, communication interface 1006, or user interface 1008. To begin, the apparatus 1000 includes means, such as processor 1002, memory 1004, communication interface 1006, user interface 1008, or the like, for receiving a 2D-plus-depth representation. As described above, the 2D-plus-depth representation includes a color image and an original depth map.

Figure 12A:
FIGS. 12A and 12B illustrate different sets of super-pixels produced by segmenting a color image, in accordance with some example embodiments.
Figure 12B:

Having received a 2D-plus-depth representation, in operation 1102 the apparatus 1000 includes means, such as processor 1002, or the like, for causing segmentation of the color image into a set of super-pixel segments. In this regard, the color image may initially be segmented into the set of super-pixels via simple linear iterative clustering or super-pixel extraction via energy-driven sampling. To this end, the tuning of segmentation parameters for different approaches to super-pixel segmentation drives the different segmentation combinations. For instance, FIGS. 12A and 12B illustrate different sets of super-pixels produced by segmenting a single color image. The illustrated super-pixel sets differ based on the choice of parameters used for the segmentation, as well as the choice of segmentation algorithm. Accordingly, the apparatus 1000 includes means, such as processor 1002, memory 1004, communication interface 1006, user interface 1008, or the like, for selecting segmentation parameters prior to causing segmentation of the color image.

The apparatus 1000 may subsequently include means, such as processor 1002 or the like, for causing generation of a compressed representation based on the segmented color image. This compressed representation may further be based on the downsampling of the original depth map, which is described below in connection with operations 1106-1110.

In some embodiments, the compressed representation may include one or more segmentation parameters associated with the segmentation of the color image and one or more downsampling parameters associated with the downsampling of the original depth map, both of which may be located in a header of the compressed representation, in some embodiments. The segmentation parameters may include a segmentation algorithm and particular variables (such as a desired number of pixels) for use with the segmentation algorithm. By using repeatable segmentation techniques, the segmentation parameters can be selected to expedite initial segmentation performance, and moreover only the parameters themselves need be known to recreate the segmentation. Thus, in some embodiments, actual storage of a segmented version of the color image is unnecessary, so long as the segmentation parameters are stored. The downsampling parameters may comprise depth intensity values for portions of the original depth map. Further, the downsampling parameters may comprise an enhancement filter that reconstruct depth data based on the downsampling of the original depth map, as well as the filter parameters for the enhancement filter that maximize a quality of the reconstruction, as described in greater detail below in conjunction with operations 1106-1110. In some embodiments, the downsampling parameters may include a binary tree, as described in greater detail below in conjunction with operation 1116 below.

Returning to FIG. 11, in operation 1104 the apparatus 1000 may include means, such as processor 1002 or the like, for evaluating the quality of the selected segmentation parameters. In this regard, these segmentation parameters may be stored as metadata in the file header of the compressed representation. Additionally or alternatively, distinct segmentation parameters can be stored separately for different levels of refinement, in accordance with operations 1120 and 1122 below.

In operations 1106 through 1110, apparatus 1000 includes means, such as processor 1002 or the like, for causing downsampling of the original depth map based on the set of super-pixel segments.

In this regard, in operation 1106 apparatus 1000 includes means, such as processor 1002 or the like, for applying a depth intensity value for each segment of the color image. In some embodiments, this operation may include several steps. For instance, the apparatus 1000 includes means, such as processor 1002 or the like, for identifying portions of the original depth map that correspond to segments of the set of super-pixel segments. Subsequently, for each identified portion of the original depth map, the apparatus 1000 may include means, such as processor 1002 or the like, for identifying a depth intensity value, and modifying portions of the original depth map based on the identified depth intensity value.

The depth within a particular super-pixel segment can be modeled in different ways. In one implementation, apparatus 1000 may include means, such as processor 1002, for selecting a single depth intensity value within the depth range of the segment that minimizes a quality cost (which may be measured using the mean square error (MSE), although other quality metrics may be used in some embodiments). Alternatively, apparatus 1000 may include means, such as processor 1002, for identifying an appropriate depth intensity value by fitting a plane (three parameters) describing the depth gradient within the segment (two or three parameters), or fitting a higher-order polynomial (in which case, either coefficients of the modeling function are stored in quantized format, or values and pixel positions that estimate it). As yet another alternative, apparatus 1000 may include means, such as processor 1002, for utilizing values of refined segments of a super-pixel to define a modeling function (e.g. plane, polynomial) on an entire area that it spans. The one or more downsampling parameters included in the compressed representation may thus include the depth intensity values identified for each portion of the original depth map.

This depth downsampling approach can be applied to floating-point non-quantized depth data, as well. Because the utilization of arithmetic or predictive coding for floating-point data is a difficult task (and usually avoided), a modification of the depth modeling algorithm is provided. In this regard, in an instance in which the depth map comprises floating point data, identifying the depth intensity value for each portion of the depth map may comprise applying a thin-plate spline fitting function to each portion of the original depth map. Thus, instead of a single value, or plane, or a polynomial function fitting of a segment, apparatus 1000 may include means, such as processor 1002, using this fitting function as a smooth shape matching approach. For the particular case of depth data, the apparatus 100 may thus model the piece-wise smooth depth function and, with super-pixel data being properly segmented, use the TPS-based fitting algorithm to generate an accurate fit for a small number of coefficients or sample data. In FIGS. 17A through 17C, a non-refined super-pixel segmentation is shown where N=256 (FIG. 17A), along with a segment span in an associated depth map (FIG. 17B). The fitting function to the segment depth data is shown in FIG. 17C utilizing just 20 pixels. In this regard, a huge segment of irregular convex shape is fitted (it spans 8% of all image data) by an arbitrary selection of 20 samples. For this given example, a Matlab's function of "tpaps" was used, although other mechanisms for applying a thin plate spline may alternatively be used. Once the TPS depth intensity data is gathered for each segment, the data can be stored in accordance with the binary tree coding approach described in operation 1112 below.

Returning to FIG. 11, operation 1108 illustrates the application of an enhancing filter to the depth data. In this regard, the apparatus 1000 may include means, such as processor 1002 or the like, for causing reconstruction of depth data from the downsampled depth map using an enhancement filter. The apparatus 1000 may include means, such as processor 1002 or the like, for causing determination of filter parameters of the enhancement filter and depth intensity values that maximize a quality of the reconstruction. In this case, the filter may be a joint bilateral filter, in which case filter parameters R, $\sigma_d$, and $\sigma_r$ affect the quality of depth data recreation. Similarly, the more accurate the depth intensity values identified for each portion of the original depth map, the better the quality of the reconstruction. Accordingly, the depth intensity values identified above in operation 1106 may correspond to the depth intensity values that maximize the quality of the reconstruction. Additionally, the downsampling parameters above may further include the filter parameters of the enhancement filter that maximize a quality of the reconstruction. In one such embodiment, these downsampling parameters may be stored in the header metadata of the compressed representation. Moreover, while the filter parameters may in some embodiments be globally applied to all portions of the original depth map, alternatively the filter parameters may be separately selected for each segmentation refinement level. In some embodiments, the filter parameters may even be selected for each individual segment, depending on the compression level desired.

Figure 16:
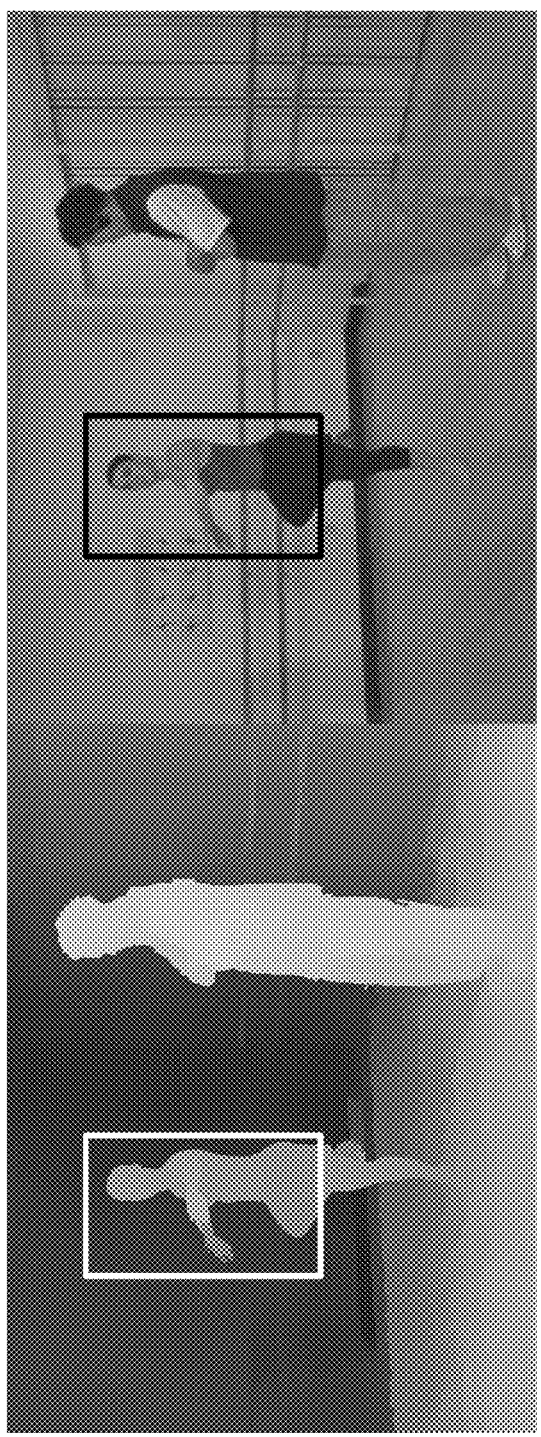
Figure 18:
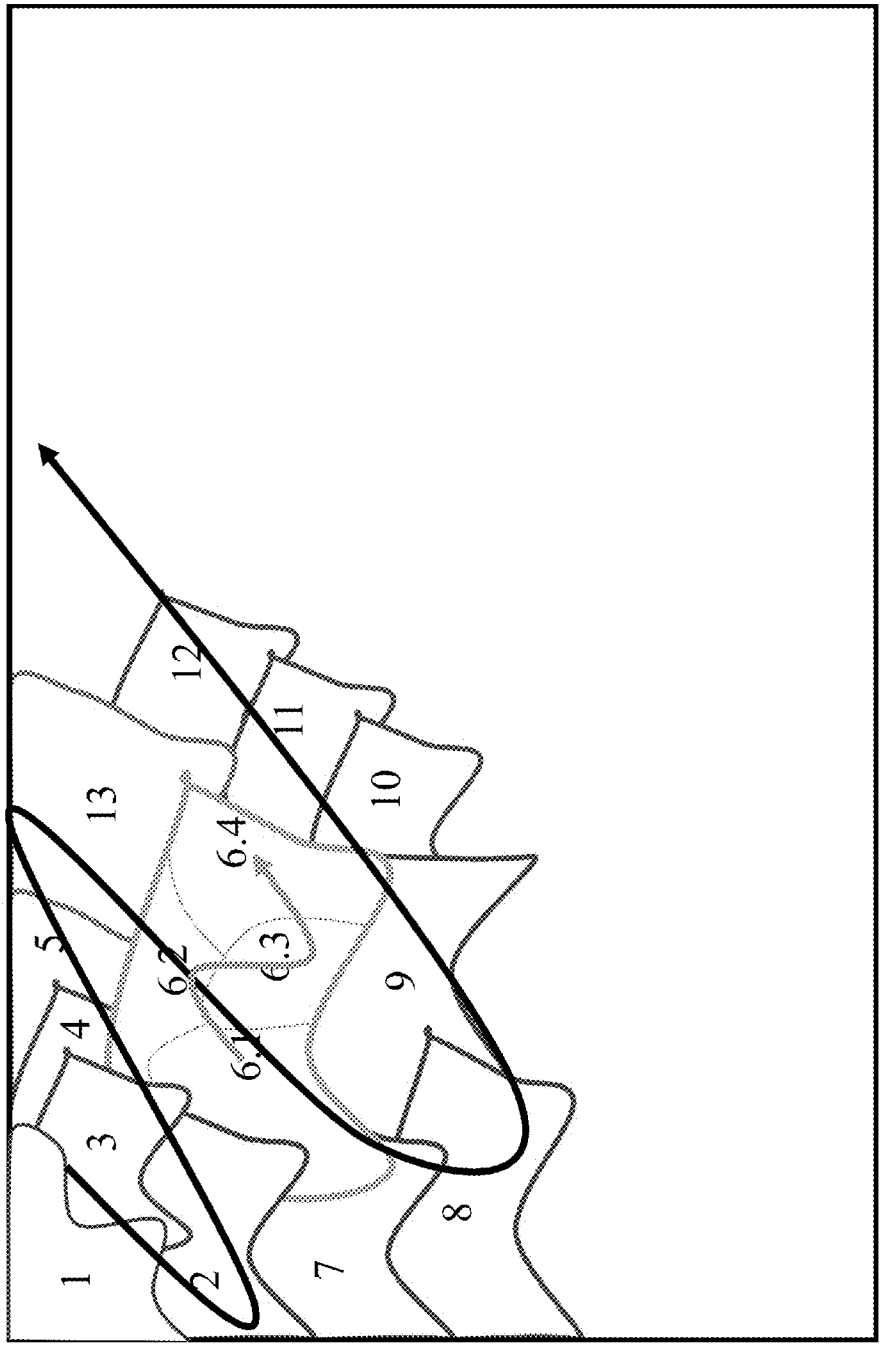
FIG. 18 illustrates a method for ordering segments in a color image, in accordance with some example embodiments.

Metric results are given in Table 2 (above), and a visual illustration is provided in FIG. 5C, discussed previously, and FIG. 16E. As background regarding FIG. 16E, FIGS. 16A through 16J illustrate a visual comparison of compression methods for a segment of a color image in a "ballet" data set. FIG. 16 illustrates an original 2D-plus-depth representation. FIG. 16A represents the uncompressed depth map. FIG. 16B illustrates the depth map generated using JPEG2000 compression. FIG. 16C illustrates the depth map generated using adaptive discrete cosine transform (DCT) based image coder (ADCTC) compression, and FIG. 16D illustrates the depth map generated using JPEG compression. FIG. 16E illustrates the depth map generated in accordance with the Ponomarenko & Gotchev format illustrated in Table 2. FIG. 16F illustrates the depth map generated using a downsampling technique for ~2400 bits, while FIG. 16G illustrates the depth map of FIG. 16F after enhancement by a post-processing filter, and FIGS. 16H, 16I, and 16J illustrate non-enhanced depth maps downsampled to 0.005 bits per pixel (bpp), 0.01 bpp, and 0.05 bpp, respectively.

FIG. 16E, in particular, illustrates that even with a very high downsampling rate, the enhancing filter is capable of reconstructing a meaningful depth map. The segment size and refinement level can be adjusted as well. In some embodiments, alternative reconstruction filters are utilized. For example, some embodiments use enhancement filters based on non-local patch-based filtering, or iterative enhancement filters based on the Richardson method described in M. Georgiev, A. Gotchev, M. Hannuksela, "Joint de-noising and fusion of 2D video and depth map sequences sensed by low-powered TOF range sensor," in International Conference on Media & Expo '13, San Jose, USA, 2013. Accordingly, the enhancement filter used in operation 1108 may be stored as one of the downsampling parameters.

In operation 1110, the apparatus 1000 may further include means, such as processor 1002 or the like, for calculating, based on the reconstruction of the depth data, depth intensity values and filter parameters of the enhancement filter that maximize a quality of the reconstruction. In some embodiments, calculating these depth intensity values and filter parameters are distinct operations. Alternatively, these operations may be jointly performed. In either case, quality can be measured using a comparison of the original depth map to the reconstructed depth data. For instance, a measurement of the MSE of the depth data provides an indication of both the bias and variance of the reconstruction, and thus the MSE of the reconstructed depth data is a useful indication of quality.

In some implementations of operation 1110, the apparatus 1000 may include means, such as processor 1002 or the like, for measuring a quality of the reconstructed depth data. If the quality of reconstructed depth data is below a predetermined threshold, then processing may return to operations 1106 or 1108 for selection of a new depth intensity value or enhancement filter parameters for the particular segment, respectively. This process may be repeated multiple times. If the quality of the reconstructed depth data satisfies the predetermined threshold, the originally identified depth intensity values and filter parameters may be retained and included in the downsampling parameters.

Figure 13:
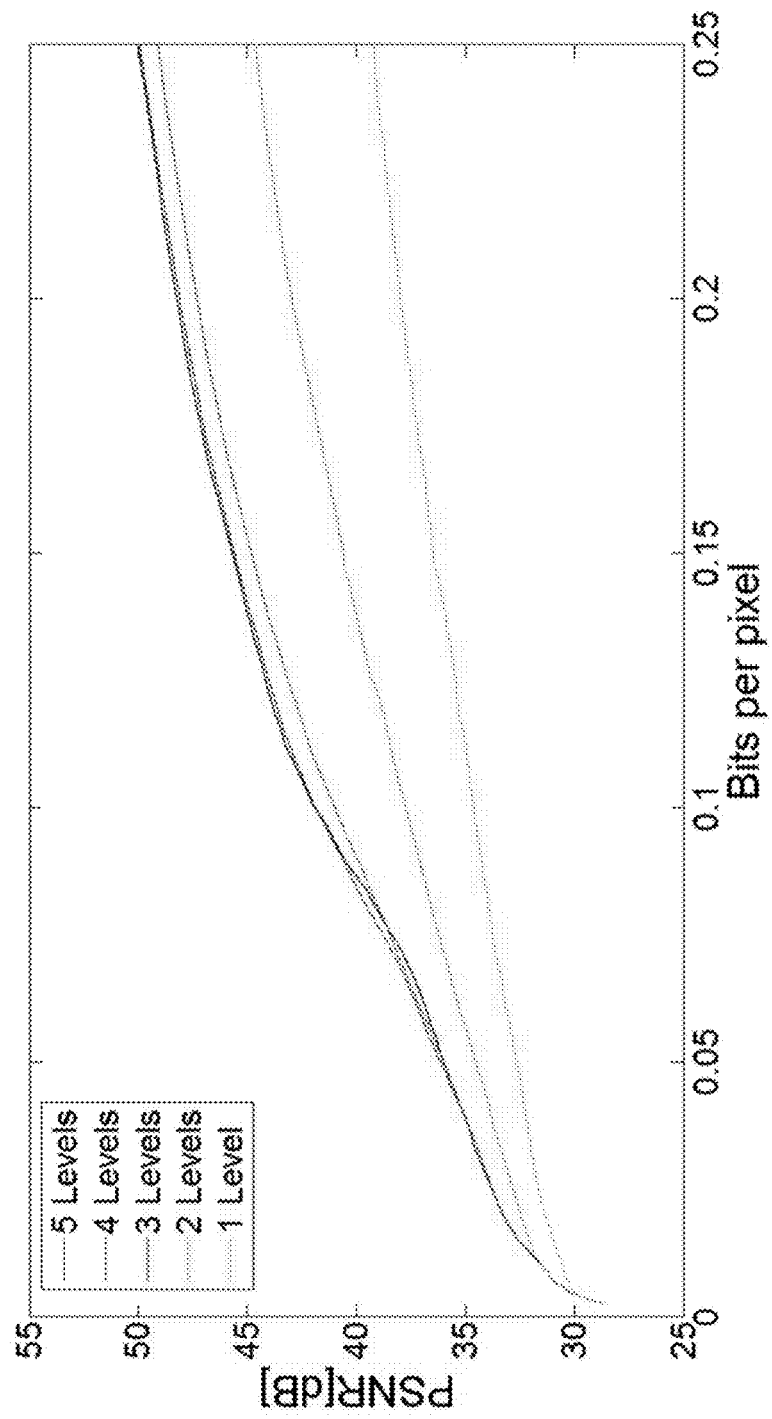
FIG. 13 illustrates different selection of levels L for compression quality and size of a compressed representation, in accordance with some example embodiments.

In operation 1112, apparatus 1000 may include means, such as processor 1002 or the like, for generating a binary tree to capture index information associated with the segmentation of the color image and the downsampled depth map. The depth intensity values may be included in the binary tree, and the compressed representation may include the generated binary tree. The number of selected layers L of the binary tree, the initial number of segments N, and a number of split sub-segments M all have direct influence on the resulting size of a coded sequence and the size of the binary tree itself for the same refinement quality. Thus, the number of layers, segments, and sub-segments must be selected and stored as parameters. The parameter M may be global for all levels of the binary tree or different for each one (but the same for all segments defining that level). Examples of different selections of levels L for compression quality and size are given in FIG. 13, in which it is apparent that the more levels L employed, the greater the fidelity of the compressed representation will have. A calculated size of tree data for different compression quality is given in Table 3.

TABLE 3

Binary Code Tree Size For Different Numbers of Used Segments:

| Blocks[number] | 1000 | 7000 | 15000 | 20000 |
|---|---|---|---|---|
| Tree Size[bytes] | 4 | 39 | 112 | 132 |
| Tree Levels[number] | 2 | 4 | 4 | 5 |

In operations 1114 and 1116, apparatus 1000 may include means, such as processor 1002 or the like, for causing application of predictive and arithmetic coding to the downsampled depth map prior to generation of the compressed representation. Predictive coding, in this regard, may utilize the generated binary tree. Moreover, these operations may in some embodiments include storing the partitioned color image using an image compression format. In some embodiments, these compression formats are utilized to further reduce the redundancy in the downsampled depth map. Such implementations may directly apply a Huffman coding. Other arithmetic coders, including some adaptive implementations are likewise possible.

The arithmetic coding illustrated in operation 1116 may bring a compression gain of about 10-15 percent, but better compression can be achieved using the predictive coding illustrated in operation 1114. For example, the downsampled depth data can be sorted by contour segmentation, as detailed in I. Schiopu, I. Tabus, "MDL segmentation and lossless compression of depth images", in IEEE Signal Processing Letters. However, instead of pixel data, an example embodiment of the present invention may utilize the super-pixel segments. The super-pixel based segmentation yields fewer segments, which reduces the amount of auxiliary data to be stored. An approach for ordering the segments is shown in FIG. 17 and works as follows. The element ordering is done by following a zig-zagging route of super-pixels, starting from the upper-left hand corner of the image. First, apparatus 1000 may include means, such as processor 10002, for ordering the super-pixels of the initial level. If a super-pixel has been split, then the sub-segments inside are ordered by priority following the same zig-zig route. Alternatively, the segments may be ordered by their texture similarity. In such a case, it is assumed that segments of similar texture belong to the same object and share similar depth values. Yet another alternative mechanism employs predictive coding as in the Lempel-Ziv scheme. This method produces at least a 2-4 times improvement in compression rate in predictive coding over the currently presented results in Table 2.

Turning now to operation 1118, the apparatus 1000 may include means, such as processor 1002 or the like, for calculating a size of the compressed representation, and in some embodiments, calculating a quality of the compressed representation. In this regard, depth and color may come from different sensors, which are not collinear. Example sensors may include a Kinect camera, other active depth (ToF) sensors, and passive stereo-matching methods. In such cases, projective alignment imposes re-sampling, and the foreground object edges can have discontinuities that are difficult to interpret. Furthermore, depth data might not be very well estimated and might produce artifacts that are related to sensing errors on object edges or with fine object details. Eventually these issues might lead to incorrect depth values for some background or foreground areas. In this manner, quality issues may arise in the compressed representation.

Moreover, trying to align erroneous depth map areas with the color image might cause oversegmenting. Oversegmenting caused by erroneous depth leads to extra data to be encoded without improving the depth quality. This effect is illustrated in FIGS. 15B and 15C, where there are a high number of refined segments, however strong residual is still concentrated on segment borders for already properly downsampled depth content.

Figure 14:
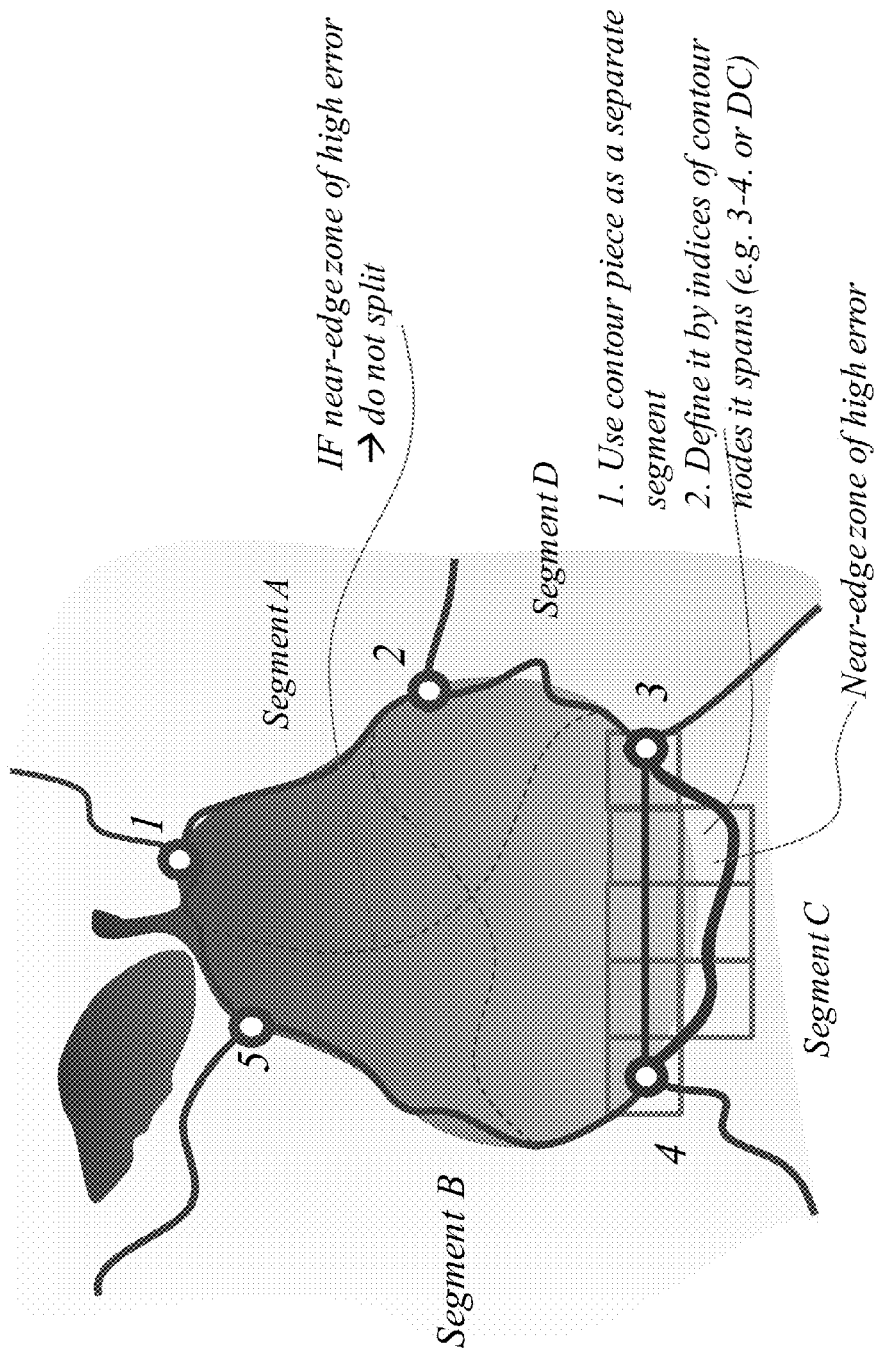
FIG. 14 illustrates a diagram detailing a diagram illustrating edge border segmentation operations, in accordance with some example embodiments.

To handle these issues, an example embodiment of the present invention may handle borders in separate segmentation trees. In some embodiments, the apparatus 1000 may include means, such as processor 1002 or the like, for separating borders into separate segments at early stages of segmentation refinement. The border segmentation can be selected as a partitioned part of a border indexed by surrounding segment nodes, as illustrated in FIG. 14. The apparatus 1000 may include means, such as processor 1002 or the like, for applying indexing directionally (e.g., in a clockwise direction starting from an upper-left node) and storing the result as an 8-bit value (thus supporting up to 256 nodes). Additionally, in some embodiments, the apparatus 1000 may include means, such as processor 1002 or the like, for selecting the border segment as an area spanned by a segment piece defined by segment nodes and line connecting them. An example of this type of edge-border segmentation is shown in FIGS. 15A through 15E.

In an instance in which the calculated size fails to satisfy a size threshold or the calculated quality of the compressed representation fails to satisfy a quality threshold, the procedure may advance to operation 1120, for further segmentation. Alternatively, the procedure may return to operation 1106, to further downsample the depth map in an attempt to further reduce the size of the compressed representation. The size and quality thresholds may be predetermined based on the application for which the procedure is being performed, or may comprise default size and quality thresholds.

In operations 1120 and 1122, apparatus 1000 may include means, such as processor 1002, or the like, for causing segmentation of a segment of the set of segments into sub-segments. In operation 1120, the apparatus 1000 may split the worst-quality segments for further refinement, and in operation 1122 update the segments in accordance with the newly generated sub-segments, and may store segmentation parameters corresponding to the generated sub-segments. Subsequently, the entire process may repeat to account for the newly-generated sub-segments. In other words, the apparatus 100 may include means, such as processor 1002, memory 1004, or the like, for further downsampling the downsampled depth map based on the set of sub-segments, updating the compressed representation based on the further downsampling, and re-calculating the size of the compressed representation and the quality of the compressed representation.

In operation 1124, apparatus 1000 includes means, such as processor 1002, memory 1004, communication interface 1006, user interface 1008, or the like, for saving the segmentation parameters associated with the segmentation of the color image and the downsampling parameters associated with the downsampling of the original depth map.

In operation 1126, apparatus 1000 includes means, such as processor 1002, memory 1004, communication interface 1006, user interface 1008, or the like, for causing storage of the compressed representation. As noted previously, the compressed representation may include one or more segmentation parameters associated with the segmentation of the color image and one or more downsampling parameters associated with the downsampling of the original depth map.

In some embodiments, these segmentation parameters and downsampling parameters are located in a header of the compressed representation.

Finally, in operation 1128, apparatus 1000 may include means, such as processor 1002, or the like, for causing embedding of the downsampled depth map in the compressed representation. In this regard, the apparatus 1000 may further include means, such as processor 1002 or the like, for causing quantization of the color image by removing a set of least significant bits associated with the color image, so that the downsampled depth map is embedded in place of the least significant bits associated with the color image. In this regard, the least significant bits may be removed according to the RGB→YUV→RGB conversion detailed above. It is expected that the data size of downsampled depth map is relatively small. Accordingly, in some embodiments the downsampled depth data can be saved as file header metadata, or embedded in the least significant bits of the color image. Alternatively, these features may only be employed when the image file format supports lossless data compression (e.g., PNG format). In the case of lossy data compression (e.g., JPEG or JPEG2000 formats) this option may be available by applying a suitable steganographic approach that preserves depth data in a lossy compressed version. For such case, the color segmentation should be applied on compressed color data that is expected after applied lossy data compression on a color plus depth embedded version of the compressed representation.

As described above, certain example embodiments of the present invention may provide effective spatial downsampling of depth images leading to high compression rates of various types of depth data, such as quantized, disparity, and floating-point non-quantized depth data. In this regard, an example embodiment of the present invention may compact depth and color data into data sizes comparable to color-only data, when stored in lossless compression image format. In some embodiments, the method, apparatus and computer program product can work as a lossless or near-lossless data approach for heavily quantized disparity maps. In fact, due to the downsampling of depth data, the resulting depth data may be small enough to be stored as metadata in a header associated with the color image data. Nevertheless, using depth data filtration methods described above, a reconstructed depth image may be similar to Ground Truth depth image, with no perceptual differences. Moreover, an example embodiment of the present invention may facilitate segmentation on real-case captured data, where possible depth sensing artifacts near object edges (e.g., occlusions or projection re-sampling) can occur. In addition, the method, apparatus and computer program product of an example embodiment may allow comparable or better quality performance to other downsampling methods, but with a less expensive implementation framework since depth filling, segmentation, predictive and arithmetic coding are relatively low-cost computations. Finally, downsampled depth maps generated by an example embodiment of the present invention may be suitable for predictive coding algorithms whose principle resembles the ones applied on raster depth map data.

As described above, FIG. 11 illustrates a flowchart of the operation of an apparatus, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 1004 of an apparatus 1000 employing an embodiment of the present invention and executed by a processor 1002 of the apparatus 1000. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which preform the specified functions, or combinations of special purpose hardware and computer instructions.

In some embodiments, certain ones of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    receiving a two-dimensional (2D)-plus-depth representation, the 2D-plus-depth representation comprising a color image and an original depth map;
    causing segmentation of the color image into a set of super-pixel segments that group data of similar color, pattern, or texture;
    causing, by a processor, downsampling of the original depth map based on the set of super-pixel segments;
    causing generation of a compressed representation based on the segmented color image and the downsampled depth map, wherein the compressed representation includes one or more segmentation parameters associated with the segmentation of the color image and one or more downsampling parameters associated with the downsampling of the original depth map, wherein the compressed representation includes a binary tree that comprises depth intensity values and compressed representations for different layers of the binary tree; and
    causing storage of the compressed representation.

2. The method of claim 1, wherein the downsampling of the original depth map comprises:
    identifying portions of the original depth map that correspond to segments of the set of super-pixel segments;
    for each identified portion of the original depth map,
        identifying a depth intensity value, and
        modifying the portion of the original depth map based on the identified depth intensity value,
    wherein the one or more downsampling parameters include the identified depth intensity values.

3. The method of claim 2, wherein, in an instance in which the original depth map comprises floating point data, identifying the depth intensity value comprises:
    applying a thin-plate spline fitting function to the portion of the original depth map.

4. The method of claim 2, further comprising:
    causing reconstruction of depth data from the downsampled depth map using an enhancement filter; and
    causing determination of filter parameters of the enhancement filter and depth intensity values that maximize a quality of the reconstruction,
    wherein the identified depth intensity values comprise the determined depth intensity values, and wherein the one or more downsampling parameters further include the determined filter parameters.

5. The method of claim 1, further comprising:
    calculating a size of the compressed representation and a quality of the compressed representation;
    in an instance in which the calculated size fails to satisfy a size threshold or the calculated quality fails to satisfy a quality threshold,
        causing segmentation of a segment from the set of segments into sub-segments,
        causing further downsampling of the downsampled depth map based on the set of sub-segments,
        causing updating of the compressed representation based on the further downsampling, and
        re-calculating the size of the compressed representation and the quality of the compressed representation.

6. The method of claim 1, further comprising:
    generating the binary tree to capture index information associated with the segmentation of the color image and the downsampled depth map.

7. The method of claim 6, further comprising:
    causing application of predictive and arithmetic coding to the downsampled depth map prior to generation of the compressed representation.

8. The method of claim 1, further comprising:
    causing embedding of the downsampled depth map in the compressed representation.

9. The method of 8, further comprising:
causing quantization of the color image by removing a set of least significant bits associated with the color image, wherein the downsampled depth map is embedded in the quantized color image of the compressed representation.

10. The method of claim 1, wherein the segmentation parameters and the downsampling parameters included in the compressed representation are located in a header of the compressed representation.

11. The method of claim 1, wherein the color image is segmented into the set of super-pixel segments via simple linear iterative clustering or super-pixel extraction via energy-driven sampling.

12. An apparatus comprising at least one processor and at least one memory including computer program code, the at least one memory and the computer program code configured to, with the at least one processor, cause the apparatus to:
receive a two-dimensional (2D)-plus-depth representation, the 2D-plus-depth representation comprising a color image and an original depth map;
segment the color image into a set of super-pixel segments that group data of similar color, pattern, or texture;
downsample the original depth map based on the set of super-pixel segments;
generate a compressed representation based on the segmented color image and the downsampled depth map, wherein the compressed representation includes one or more segmentation parameters associated with the segmentation of the color image and one or more downsampling parameters associated with the downsampling of the original depth map, wherein the compressed representation includes a binary tree that comprises depth intensity values and compressed representations for different layers of the binary tree; and
cause storage of the compressed representation.

13. The apparatus of claim 12, wherein the downsampling the original depth map comprises:
identifying portions of the original depth map that correspond to segments of the set of super-pixel segments;
for each identified portion of the original depth map,
identifying a depth intensity value, and
modifying the portion of the original depth map based on the identified depth intensity value,
wherein the one or more downsampling parameters include the identified depth intensity values.

14. The apparatus of claim 13, wherein the at least one memory and the computer program code are configured to, with the at least one processor, cause the apparatus to:
reconstruct depth data from the downsampled depth map using an enhancement filter; and
determine filter parameters of the enhancement filter and depth intensity values that maximize a quality of the reconstruction,
wherein the identified depth intensity values comprise the determined depth intensity values, and wherein the one or more downsampling parameters further include the determined filter parameters.

15. The apparatus of claim 12, wherein the at least one memory and the computer program code are configured to, with the at least one processor, cause the apparatus to:
calculate a size of the compressed representation and a quality of the compressed representation;
in an instance in which the calculated size fails to satisfy a size threshold or the calculated quality fails to satisfy a quality threshold,
segment a segment from the set of segments into sub-segments,
further downsample the downsampled depth map based on the sub-segments,
update the compressed representation based on the further downsampling, and
re-calculate the size of the compressed representation and the quality of the compressed representation.

16. The apparatus of claim 12, wherein the at least one memory and the computer program code are configured to, with the at least one processor, cause the apparatus to:
generate the binary tree to capture index information associated with the segmentation of the color image and the downsampled depth map; and
causing application of predictive and arithmetic coding to the downsampled depth map prior to generation of the compressed representation.

17. The apparatus of claim 12, wherein the at least one memory and the computer program code are configured to, with the at least one processor, cause the apparatus to embed the downsampled depth map in the compressed representation.

18. A computer program product comprising at least one non-transitory computer-readable storage medium having computer-executable program code portions stored therein, the computer-executable program code portions comprising program code instructions that, when executed, cause an apparatus to:
receive a two-dimensional (2D)-plus-depth representation, the 2D-plus-depth representation comprising a color image and an original depth map;
segment the color image into a set of super-pixel segments that group data of similar color, pattern, or texture;
downsample the original depth map based on the set of super-pixel segments;
generate a compressed representation based on the segmented color image and the downsampled depth map, wherein the compressed representation includes one or more segmentation parameters associated with the segmentation of the color image and one or more downsampling parameters associated with the downsampling of the original depth map, wherein the compressed representation includes a binary tree that comprises depth intensity values and compressed representations for different layers of the binary tree; and
cause storage of a compressed representation.

19. The computer program product of claim 18, wherein the program code instructions, when executed, cause the apparatus to:
reconstruct depth data from the downsampled depth map using an enhancement filter; and
determine filter parameters of the enhancement filter and depth intensity values that maximize a quality of the reconstruction,
wherein the one or more downsampling parameters include the determined filter parameters and depth intensity values.

20. An apparatus comprising:
means for receiving a two-dimensional (2D)-plus-depth representation, the 2D-plus-depth representation comprising a color image and an original depth map;
means for segmenting the color image into a set of super-pixel segments that group data of similar color, pattern, or texture;
means for downsampling the original depth map based on the set of super-pixel segments;

means for generating a compressed representation based on the segmented color image and the downsampled depth map, wherein the compressed representation includes one or more segmentation parameters associated with the segmentation of the color image and one or more downsampling parameters associated with the downsampling of the original depth map, wherein the compressed representation includes a binary tree that comprises depth intensity values and compressed representations for different layers of the binary tree; and
means for causing storage of the compressed representation.

* * * * *

UNITED STATES PATENT AND TRADEMARK OFFICE
CERTIFICATE OF CORRECTION

| | |
|---|---|
| PATENT NO. | : 9,736,455 B2 |
| APPLICATION NO. | : 14/497687 |
| DATED | : August 15, 2017 |
| INVENTOR(S) | : Georgiev et al. |

Page 1 of 1

It is certified that error appears in the above-identified patent and that said Letters Patent is hereby corrected as shown below:

In the Claims

Column 27,
Line 1, in Claim 9 "of" should read --of claim--.

Signed and Sealed this
Eighth Day of May, 2018

Andrei Iancu
*Director of the United States Patent and Trademark Office*